US009977241B2

United States Patent
Yajima et al.

(10) Patent No.: US 9,977,241 B2
(45) Date of Patent: May 22, 2018

(54) HEAD-MOUNTED DISPLAY DEVICE, CONTROL METHOD FOR HEAD-MOUNTED DISPLAY DEVICE, AND COMPUTER PROGRAM

(71) Applicant: SEIKO EPSON CORPORATION, Tokyo (JP)

(72) Inventors: Kenro Yajima, Matsumoto (JP); Yuichi Mori, Minowa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/070,469

(22) Filed: Mar. 15, 2016

(65) Prior Publication Data

US 2016/0274358 A1 Sep. 22, 2016

(30) Foreign Application Priority Data

Mar. 17, 2015 (JP) .................................. 2015-052816
Dec. 24, 2015 (JP) .................................. 2015-251491

(51) Int. Cl.
G02B 27/01 (2006.01)
G06F 3/01 (2006.01)
G02B 27/00 (2006.01)

(52) U.S. Cl.
CPC ....... *G02B 27/017* (2013.01); *G02B 27/0093* (2013.01); *G06F 3/013* (2013.01); *G02B 2027/014* (2013.01); *G02B 2027/0129* (2013.01); *G02B 2027/0134* (2013.01); *G02B 2027/0138* (2013.01); *G02B 2027/0178* (2013.01)

(58) Field of Classification Search
CPC combination set(s) only.
See application file for complete search history.

(56) References Cited

U.S. PATENT DOCUMENTS

| 2010/0287500 | A1* | 11/2010 | Whitlow | G02B 27/01 715/810 |
| 2012/0224060 | A1* | 9/2012 | Gurevich | B60R 1/00 348/148 |
| 2012/0327116 | A1 | 12/2012 | Liu et al. | |
| 2014/0354534 | A1* | 12/2014 | Mullins | G06F 3/015 345/156 |

FOREIGN PATENT DOCUMENTS

| JP | 3753882 B2 | 3/2006 |
| JP | 2014-526157 A | 10/2014 |
| JP | 2014-225727 A | 12/2014 |
| WO | 2014/185002 A1 | 11/2014 |

\* cited by examiner

*Primary Examiner* — Robin Mishler
(74) *Attorney, Agent, or Firm* — Oliff PLC

(57) ABSTRACT

A head-mounted display device includes an image display section capable of displaying an image in a display region, a visual-line-direction specifying section configured to specify a visual line direction of a user, and an image changing section configured to change, according to the specified visual line direction, a display image displayed in the display region.

28 Claims, 20 Drawing Sheets

HEAD-MOUNTED DISPLAY DEVICE, CONTROL METHOD FOR HEAD-MOUNTED DISPLAY DEVICE, AND COMPUTER PROGRAM

BACKGROUND

1. Technical Field

The present invention relates to a technique of a head-mounted display device.

2. Related Art

There is known a head-mounted display device (a head mounted display (HMD)), which is a display device mounted on a head. For example, the head-mounted display device generates image light representing an image using a liquid crystal display and a light source and guides the generated image light to the eyes of a user using projection optical systems and light guide plates to thereby cause the user to visually recognize a virtual image. As the head-mounted display device, there are two types, that is, a transmission type with which the user can visually recognize an outside scene in addition to the virtual image and a non-transmission type with which the user cannot visually recognize the outside scene. As the head-mounted display device of the transmission type, there are an optical transmission type and a video transmission type.

JP-T-2014-526157 (Patent Literature 1) describes a head-mounted display device that divides the visual field of a user into two or more regions and displays, in each of the divided regions, a virtual image associated with the divided region. JP-A-11-54778 (Patent Literature 2) describes a multimodal interface that displays, in the vicinity of a detected visual line position of a user, an image indicating guide information for assisting an input. JP-A-2014-225727 (Patent Literature 3) describes a head-mounted display device that displays an image visually recognized by a user in a position same as the distance to a gazing point of the user that changes according to a moving state such as walking of the user.

However, in the technique described in Patent Literature 1, when there are many virtual images displayed in the divided regions, a load of processing for displaying the virtual images is large. It is likely that a delay occurs in the display of the virtual images. In the techniques described in Patent Literatures 2 and 3 as well, when the capacity of the displayed image is large, a load of processing for displaying the image is sometimes large. Besides, in the technique of the head-mounted display device in the past, there have been demands for a reduction in the size, a reduction in the costs, easiness of manufacturing, improvement of convenience of use, and the like of the head-mounted display device.

SUMMARY

An advantage of some aspects of the invention is to solve at least a part of the problems described above, and the invention can be implemented as the following forms.

(1) An aspect of the invention provides a head-mounted display device. The head-mounted display device includes: an image display section capable of displaying an image in a display region; a visual-line-direction specifying section configured to specify a visual line direction of a user; and an image changing section configured to change, according to the specified visual line direction, a display image displayed in the display region. With the head-mounted display device according to this aspect, a display form of an image is changed according to a position visually recognized by the user. Therefore, it is possible to reduce a load of processing for displaying the image without deteriorating visibility for the display image of the user.

(2) In the head-mounted display device according to the aspect, the image changing section may change the display image according to a visual characteristic of the user that changes according to the specified visual line direction. With the head-mounted display device in this aspect, it is possible to increase speed of the processing for displaying the image without spoiling the visual characteristic such as recognition of the user for visually recognizing the image.

(3) In the head-mounted display device according to the aspect, the visual characteristic may be a characteristic related to a saccade, and the image changing section may set, as a visual field range of the user, a range added with a visual angle by the saccade. With the head-mounted display device in this aspect, a display form of the display image is set taking into account the saccade. Therefore, it is possible to display, in advance, in the display region, an image that also takes into account a range of an eye movement unintended by the user.

(4) In the head-mounted display device according to the aspect, the image changing section may change, in displaying the display image in a part of the display region, the display image according to a position of the display image and the visual line direction. With the head-mounted display device according to the aspect, it is possible to increase the speed of the processing for displaying the image without reducing easiness of the recognition of the user for visually recognizing the image.

(5) In the head-mounted display device according to the aspect, the image display section may be capable of transmitting an outside scene, the head-mounted display device may further include an outside-scene-image pickup section configured to pick up an image of the outside scene, and the image changing section may detect a specific target object from the picked-up image of the outside scene and set a position of the display image in association with a position of the detected specific target object. With the head-mounted display device according to this aspect, it is possible to cause the user to more clearly visually recognize a correspondence relation between the specific target object and the displayed image. Thus, convenience of use for the user is improved.

(6) In the head-mounted display device according to the aspect, the visual-line-direction specifying section may include a display-section-direction detecting section configured to detect a direction of the image display section and may specify the visual line direction on the basis of the detected direction of the image display section. With the head-mounted display device according to this aspect, for example, it is possible to simply and inexpensively specify a visual line direction of the user without using a device for picking up an image of the eyes of the user.

(7) The head-mounted display device according to the aspect, the visual-line-direction specifying section may include an eye-image pickup section configured to pick up an image of eyes of the user and may specify the visual line direction on the basis of the picked-up image of the eyes of the user. With the head-mounted display device according to this aspect, it is possible to accurately specify the visual line direction of the user.

(8) In the head-mounted display device according to the aspect, the visual-line-direction specifying section may further specify a distance to a visual recognition target visually recognized by the user, and the image changing section may set, on the basis of the visual recognition target and a movement characteristic based on a moving background that is a range other than the visual recognition target and is moving with respect to the visual recognition target, a display form of the display image associated with the specific target object. With the head-mounted display device according to this aspect, the display form of the image is set according to comparison of moving speed with moving speed of the visual recognition target visually recognized by the user. Therefore, it is possible to adjust a realistic feeling given to the user.

(9) In the head-mounted display device according to the aspect, when the specific target object is the moving background, the image changing section may set the display form of the display image associated with the specific target object to a simple form compared with when the specific target object is not moving with respect to the visual recognition target. With the head-mounted display device in this aspect, processing for displaying an image associated with a target moving at moving speed different from the moving speed of the visual recognition target is reduced. Therefore, it is possible to reduce a load of the processing without reducing visibility of the image of the user.

(10) In the head-mounted display device according to the aspect, the image display section may be capable of transmitting an outside scene image, the head-mounted display device may further include: an outside-scene-image pickup section configured to pick up an image of the outside scene; and an image-data acquiring section configured to identify and acquire image data, which is a source of the display image associated with the specific target object, for each of types of the image data, and, when the outside-scene-image pickup section picks up an image of the specific target object, the image changing section may determine, on the basis of a type of the image data acquired by the image-data acquiring section and a position of the image picked-up specific target object with respect to the display region, a form of the display image associated with the specific target object. With the head-mounted display device in this aspect, a display form of an image visually recognized by the user is different according to the type of the image data. Therefore, it is possible to cause the user to visually recognize an image corresponding to necessity.

(11) In the head-mounted display device according to the aspect, the head-mounted display device may further include a moving-object specifying section configured to specify a moving object moving in the outside scene, and the image changing section may set, on the basis of speed of the moving object approaching the image display section, a display form of the display image associated with the specific target object. With the head-mounted display device in this aspect, it is possible to inform the user of a danger concerning an automobile or the like approaching the user.

(12) In the head-mounted display device according to the aspect, when the moving object outside a predetermined region centering on the visual line direction approaches the image display section at speed equal to or higher than speed set in advance, the image changing section may determine the moving object as the specific target object even if the moving object is not set as the specific target object in advance and set, in the determined specific target object, the display image set in advance. With the head-mounted display device according to this aspect, it is possible to cause the user to visually recognize a necessary image only when necessary. Therefore, convenience of use of the head-mounted display device for the user is improved.

(13) In the head-mounted display device according to the aspect, when the display image includes a character image, the image changing section may cause the image display section to display the character image in the display region as the display image in a first visual field range including the specified visual line direction and may not cause the image display section to display the character image in the display region as the display image in a second visual field range larger than the first visual field range and not including the first visual field range. With the head-mounted display device according to this aspect, an image not including the character image is displayed in the display region in a visual field range in which it is difficult for the user to recognize characters. Therefore, it is possible to increase speed of the processing for displaying the image without further reducing easiness of recognition of the user who visually recognizes the image.

(14) In the head-mounted display device according to the aspect, when the display image is an image visually recognized by the user as a three-dimensional image, the image changing section may cause the image display section to display the display image in the display region as the three-dimensional image in a third visual field range including the specified visual line direction and cause the image display section to display the display image in the display region to be recognized as a two-dimensional image by the user in a fourth visual field range larger than the third visual field range and not including the third visual field range. With the head-mounted display device according to this aspect, the two-dimensional image is displayed in the display region in a visual field range in which it is hard for the user to visually recognize the distance to the display image. Therefore, it is possible to further increase the speed of the processing for displaying the image without reducing easiness of recognition of the user who visually recognizes an associated image.

(15) In the head-mounted display device according to the aspect, when the display image is an image including information of a plurality of colors, the image changing section may cause the image display section to display the display image in the display region as the image including the information of the plurality of colors in a fifth visual field range including the specified visual line direction and cause the image display section to display the display image in the display region using light and shade of a single color in a sixth visual field range larger than the fifth visual field range and not including the fifth visual field range. With the head-mounted display device according to this aspect, it is possible to further increase the speed of the processing for displaying the image without reducing the easiness of the recognition of the user who visually recognizes the image.

(16) In the head-mounted display device according to the aspect, the image changing section may cause the image display section to display only a contour of the display image in the display region in the sixth visual field range. With the head-mounted display device according to this aspect, only an outer frame of the image is displayed in a range in which it is hard for the user to recognize color information. Therefore, it is possible to further increase the speed of the processing for displaying the image without reducing easiness of recognition of the user who visually recognizes an associated image.

(17) In the head-mounted display device according to the aspect, the image changing section may cause the image display section to display, in an eighth visual field range larger than a seventh visual field range including the specified visual line direction and not including the seventh visual field range, the display image in the display region as a simple image further simplified than an image displayed in the seventh visual field range. With the head-mounted display device according to this aspect, only the simplified image indicating only that the image is present is displayed in the display region in a visual field range in which the user cannot recognize detailed content of the display image. Therefore, it is possible to further increase speed of processing for displaying an associated image without reducing easiness of recognition of the user who visually recognizes the associated image.

Not all of a plurality of constituent elements of the aspects of the invention explained above are essential. To solve a part or all of the problems or to achieve a part or all of the effects described in this specification, concerning a part of the plurality of constituent elements, it is possible to appropriately perform a change, deletion, replacement with new other constituent elements, and partial deletion of limited contents. To solve a part or all of the problems or to achieve a part or all of the effects described in this specification, it is also possible to combine a part or all of the technical features included in one aspect of the invention with apart or all of the technical features included in the other aspects of the invention to obtain an independent aspect of the invention.

For example, an aspect of the invention can be implemented as a device including a part or all of the three elements, that is, the image display section, the visual-line-direction specifying section, and the image changing section. That is, the device may or may not include the image display section. The device may or may not include the visual-line-direction specifying section. The device may or may not include the image changing section. For example, the image display section may be capable of displaying an image in the display region. For example, the visual-line-direction specifying section may specify a visual line direction of the user. For example, the image changing section may change, according to the specified visual line direction, the display image displayed in the display region. The device can be implemented as, for example, a head-mounted display device. However, the device can also be implemented as devices other than the head-mounted display device. According to such an aspect, it is possible to solve at least one of various problems such as improvement of operability and simplification of the device, integration of the device, and improvement of convenience of the user who uses the device. A part or all of the technical features of the aspects of the head-mounted display device can be applied to the device.

The invention can also be implemented in various forms other than the head-mounted display device. For example, the invention can be implemented in forms such as a display device, a control method for the head-mounted display device and the display device, a control system, a head-mounted display system, a computer program for implementing functions of the display device, the control system, and the head-mounted display system, a recording medium having recorded therein the computer program, and a data signal including the computer program and embodied in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

A-1. Configuration of a Head-Mounted Display Device

Figure 1:
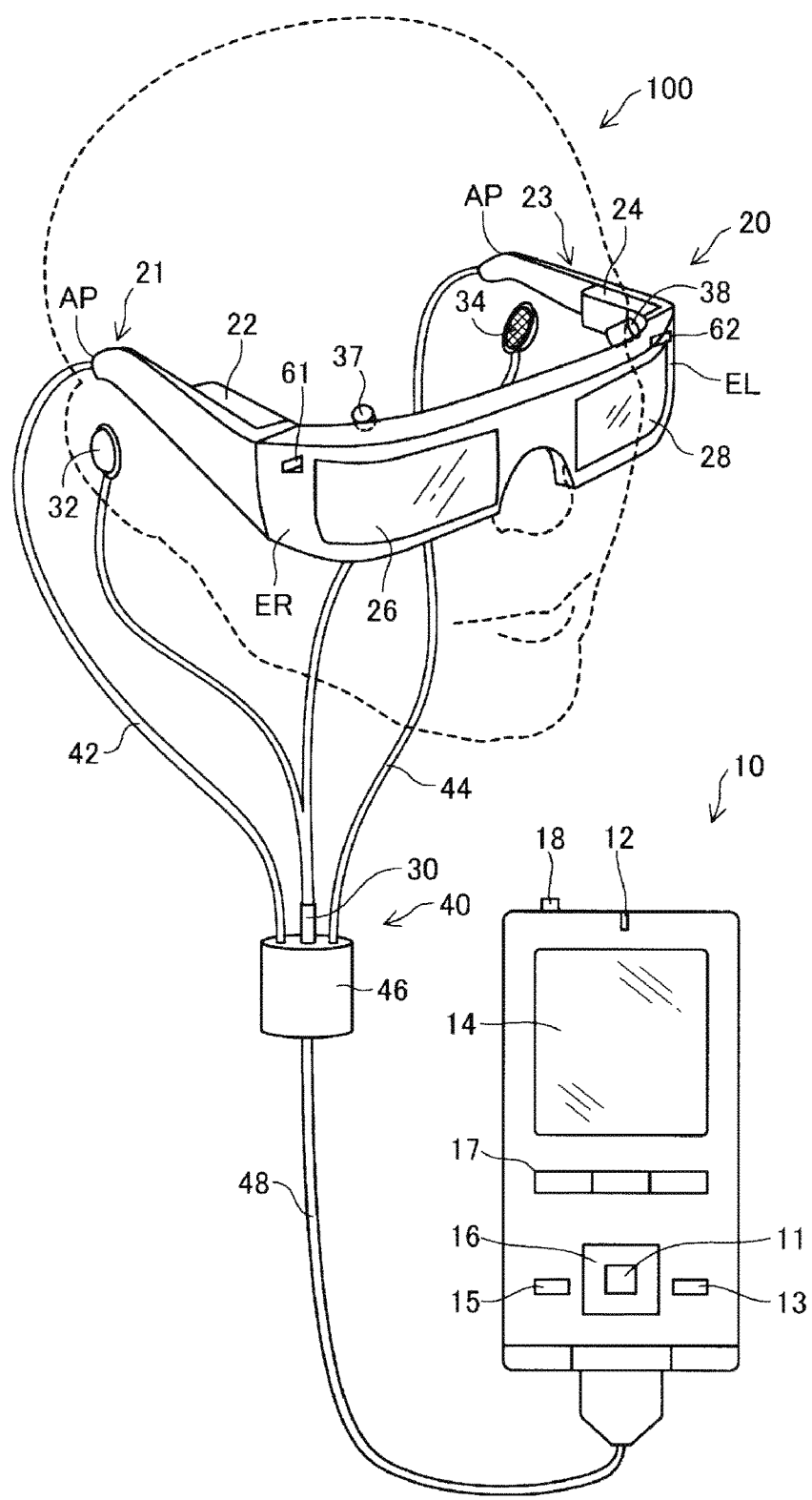
FIG. 1 is an explanatory diagram showing the exterior configuration of a head-mounted display device (HMD) in a first embodiment.

FIG. 1 is an explanatory diagram showing the exterior configuration of a head-mounted display device 100 (an HMD 100) in a first embodiment. The head-mounted display device 100 is a display device mounted on a head and is also called head mounted display (HMD). The HMD 100 in this embodiment is an optically transmissive head-mounted display device with which a user can visually recognize a virtual image and at the same time directly visually recognize an outside scene. Note that, in this specification, the virtual image visually recognized by the user using the HMD 100 is also referred to as "display image" for convenience.

The HMD 100 includes an image display section 20 that causes the user to visually recognize the virtual image in a state in which the image display section 20 is worn on the head of the user and a control section 10 (a controller 10) that controls the image display section 20.

The image display section 20 is a wearing body worn on the head of the user. In this embodiment, the image display section 20 has an eyeglass shape. The image display section 20 includes a right holding section 21, a right display driving section 22, a left holding section 23, a left display driving section 24, a right optical-image display section 26, a left optical-image display section 28, a first camera 61, a second camera 62, a right-eye-image pickup camera 37, and a left-eye-image pickup camera 38. The right optical-image display section 26 and the left optical-image display section 28 are disposed to be respectively located in front of the right eye and in front of the left eye of the user when the user wears the image display section 20. One end of the right optical-image display section 26 and one end of the left optical-image display section 28 are connected to each other in a position corresponding to the middle of the forehead of the user when the user wears the image display section 20.

The right holding section 21 is a member provided to extend from an end portion ER, which is the other end of the right optical-image display section 26, to a position corresponding to the temporal region of the user when the user wears the image display section 20. Similarly, the left holding section 23 is a member provided to extend from an end portion EL, which is the other end of the left optical-image display section 28, to a position corresponding to the temporal region of the user when the user wears the image display section 20. The right holding section 21 and the left holding section 23 hold the image display section 20 on the head of the user like temples of eyeglasses.

The right display driving section 22 and the left display driving section 24 are disposed on sides opposed to the head of the user when the user wears the image display section 20. Note that, in the following explanation, the right holding section 21 and the left holding section 23 are collectively simply referred to as "holding sections" as well, the right display driving section 22 and the left display driving section 24 are collectively simply referred to as "display driving sections" as well, and the right optical-image display section 26 and the left optical-image display section 28 are collectively simply referred to as "optical-image display sections" as well.

The display driving sections 22 and 24 include liquid crystal displays 241 and 242 (hereinafter referred to as "LCDs 241 and 242" as well) and projection optical systems 251 and 252 (see FIG. 2). Details of the configuration of the display driving sections 22 and 24 are explained below. The optical-image display sections 26 and 28 functioning as optical members include light guide plates 261 and 262 (see FIG. 2) and dimming plates. The light guide plates 261 and 262 are formed of a light transmissive resin material or the like and guide image lights output from the display driving sections 22 and 24 to the eyes of the user. The dimming plates are thin plate-like optical elements and are arranged to cover the front side of the image display section 20 on the opposite side of the side of the eyes of the user. The dimming plates protect the light guide plates 261 and 262 and suppress damage, adhesion of soil, and the like to the light guide plates 261 and 262. By adjusting the light transmittance of the dimming plates, it is possible to adjust an external light amount entering the eyes of the user and adjust easiness of visual recognition of the virtual image. Note that the dimming plates can be omitted.

The first camera 61 and the second camera 62 pick up images of an outside scene. The first camera 61 and the second camera 62 are respectively disposed in different positions of the image display section 20. The first camera 61 is disposed at the end portion ER, which is the other end of the right optical-image display section 26, in the direction of the head of the user when the image display section 20 is worn on the user. Similarly, the second camera 62 is disposed at the end portion EL, which is the other end of the left optical-image display section 28, in the direction of the head of the user when the image display section 20 is worn on the user. In this embodiment, the first camera 61 and the second camera 62 are respectively disposed line-symmetrically with respect to a center line that passes a position, which is the center of the image display section 20, where one end of the right optical-image display section 26 and one end of the left optical-image display section 28 are connected. Note that, in the following explanation, the first camera 61 and the second camera 62 are collectively simply referred to as cameras 61 and 62 as well. In this embodiment, a place where the first camera 61 is disposed in the image display section 20 and a place where the second camera 62 is disposed in the image display section 20 are different. Therefore, the distance to a target object, an image of which is picked up in both of an image pickup range of the first camera 61 and an image pickup range of the second camera 62, can be calculated using the trigonometry. Note that the cameras 61 and 62 are equivalent to the outside-scene-image pickup section in the appended claims.

The right-eye-image pickup camera 37 is a camera that picks up an image of the right eye of the user wearing the image display section 20. Similarly, the left-eye-image pickup camera 38 is a camera that picks up an image of the left eye of the user wearing the image display section 20. The image of the right eye of the user picked up by the right-eye-image pickup camera 37 and the image of the left eye of the user picked up by the left-eye-image pickup camera 38 are used by a direction specifying section 166 explained below in processing for specifying a visual line direction of the user. Note that the right-eye-image pickup camera 37 and the left-eye-image pickup camera 38 are monocular cameras but may be stereo cameras. In the following explanation, the right-eye-image pickup camera 37 and the left-eye-image pickup camera 38 are collectively referred to as eye-image pickup cameras 37 and 38 as well. The eye-image pickup cameras 37 and 38 and the direction specifying section 166 are equivalent to the visual-line-direction specifying section in the appended claims. The eye-image pickup cameras 37 and 38 are equivalent to the eye-image pickup section in the appended claims.

The image display section 20 further includes a connecting section 40 for connecting the image display section 20 to the control section 10. The connecting section 40 includes a main body cord 48 connected to the control section 10, a right cord 42 and a left cord 44, and a coupling member 46. The right cord 42 and the left cord 44 are two cords branching from the main body cord 48. The right cord 42 is inserted into a housing of the right holding section 21 from a distal end portion AP in an extending direction of the right holding section 21 and connected to the right display driving section 22. Similarly, the left cord 44 is inserted into a housing of the left holding section 23 from a distal end portion AP in an extending direction of the left holding section 23 and connected to the left display driving section 24. The coupling member 46 is provided at a branching point of the main body cord 48 and the right cord 42 and the left cord 44. The coupling member 46 includes a jack for connecting an earphone plug 30. A right earphone 32 and a left earphone 34 extend from the earphone plug 30.

The image display section 20 and the control section 10 perform transmission of various signals via the connecting section 40. Connectors (not shown in the figure), which fit with each other, are respectively provided at an end of the main body cord 48 on the opposite side of the coupling member 46 and in the control section 10. The control section 10 and the image display section 20 are connected and disconnected according to fitting and unfitting of the connector of the main body cord 48 and the connector of the control section 10. For example, a metal cable or an optical fiber can be adopted as the right cord 42, the left cord 44, and the main body cord 48.

The control section 10 is a device for controlling the HMD 100. The control section 10 includes a determination key 11, a lighting section 12, a display switching key 13, a track pad 14, a luminance switching key 15, a direction key 16, a menu key 17, and a power switch 18. The determination key 11 detects pressing operation and outputs a signal for determining contents of the operation in the control section 10. The lighting section 12 notifies, with a light emission state thereof, an operation state of the HMD 100. As the operation state of the HMD 100, there is, for example, ON/OFF of a power supply. As the lighting section 12, for example, an LED (Light Emitting Diode) is used. The display switching key 13 detects pressing operation and outputs, for example, a signal for switching a display form of a content moving image to 3D and 2D. The track pad 14 detects operation by a finger of the user on an operation surface of the track pad 14 and outputs a signal corresponding to detected content. As the track pad 14, various types such as an electrostatic type, a pressure detection type, and an optical type can be adopted. The luminance switching key 15 detects pressing operation and outputs a signal for increasing or reducing the luminance of the image display section 20. The direction key 16 detects pressing operation on keys corresponding to the upward, downward, left, and right directions and outputs a signal corresponding to detected content. The power switch 18 detects slide operation of the switch to switch a power supply state of the HMD 100.

Figure 2:
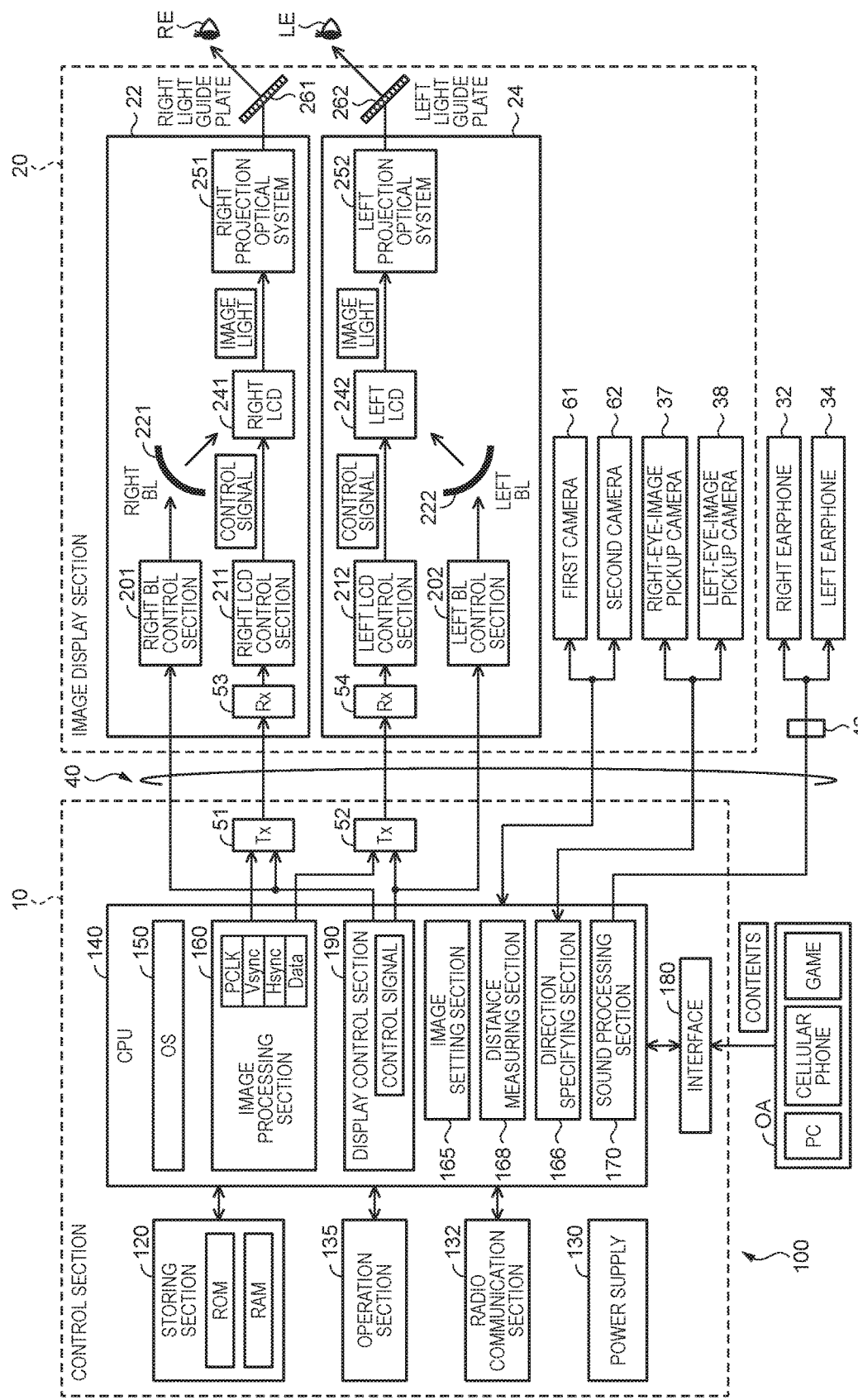
FIG. 2 is a block diagram functionally showing the configuration of the HMD in the first embodiment.

FIG. 2 is a block diagram functionally showing the configuration of the HMD 100 in this embodiment. As shown in FIG. 2, the control section 10 includes a storing section 120, a power supply 130, a radio communication section 132, an operation section 135, a CPU 140, an interface 180, and a transmitting section 51 (Tx 51) and a transmitting section 52 (Tx 52). The operation section 135 receives operation by the user. The operation section 135 is configured from the determination key 11, the display switching key 13, the track pad 14, the luminance switching key 15, the direction key 16, the menu key 17, and the power switch 18. The power supply 130 supplies electric power to the sections of the HMD 100. As the power supply 130, for example, a secondary cell can be used. The radio communication section 132 performs radio communication with other apparatuses such as a contents server, a television, and a personal computer according to a predetermined radio communication standard such as a wireless LAN or a Bluetooth.

The storing section 120 includes a ROM having stored therein a computer program and a RAM used by the CPU 140 in executing writing and reading of various computer programs.

The CPU 140 reads out a computer program stored in the ROM of the storing section 120 and executes writing in and reading from the RAM of the storing section 120 to thereby function as an operating system 150 (OS 150), a display control section 190, a sound processing section 170, an image processing section 160, an image setting section 165, a distance measuring section 168, and the direction specifying section 166.

The display control section 190 generates control signals for controlling the right display driving section 22 and the left display driving section 24. Specifically, the display control section 190 individually controls, using the control signals, ON/OFF of driving of the right LCD 241 by a right LCD control section 211, ON/OFF of driving of a right backlight 221 by a right backlight control section 201, ON/OFF of driving of the left LCD 242 by a left LCD control section 212, ON/OFF of driving of a left backlight 222 by a left backlight control section 202, and the like. Consequently, the display control section 190 controls generation and emission of image lights respectively by the right display driving section 22 and the left display driving section 24. For example, the display control section 190 causes both of the right display driving section 22 and the left display driving section 24 to generate image light, causes only one of the right display driving section 22 and the left display driving section 24 to generate image light, or does not cause both of the right display driving section 22 and the left display driving section 24 to generate image light. Note that generating image light is referred to as "display an image" as well.

The display control section 190 transmits control signals for the right LCD control section 211 and the left LCD control section 212 respectively via the transmitting sections 51 and 52. The display control section 190 respectively transmits control signals for the right backlight control section 201 and the left backlight control section 202.

The image processing section 160 acquires an image signal included in contents. The image processing section 160 separates synchronization signals such as a vertical synchronization signal VSync and a horizontal synchronization signal HSync from the acquired image signal. The image processing section 160 generates a clock signal PCLK using a PLL (Phase Locked Loop) circuit or the like (not shown in the figure) according to cycles of the separated vertical synchronization signal VSync and horizontal synchronization signal HSync. The image processing section 160 converts an analog image signal, from which the synchronization signals are separated, into a digital image signal using an A/D conversion circuit or the like (not shown in the figure). Thereafter, the image processing section 160 stores the digital image signal after the conversion in a DRAM in the storing section 120 frame by frame as image data (RGB data) of a target image. Note that the image processing section 160 may execute, on the image data, image processing such as resolution conversion processing, various kinds of tone correction processing for adjustment of luminance and chroma, and keystone correction processing according to necessity.

The image processing section 160 transmits the clock signal PCLK, the vertical synchronization signal VSync, and the horizontal synchronization signal HSync generated by the image processing section 160 and the image data stored in the DRAM in the storing section 120 respectively via the transmitting sections 51 and 52. Note that the image data transmitted via the transmitting section 51 is referred to as "image data for right eye" as well. The image data transmitted via the transmitting section 52 is referred to as "image data for left eye" as well. The transmitting sections 51 and 52 function as a transceiver for serial transmission between the control section 10 and the image display section 20.

The sound processing section 170 acquires a sound signal included in the contents, amplifies the acquired sound signal, and supplies the amplified sound signal to a speaker (not shown in the figure) in the right earphone 32 and a speaker (not shown in the figure) in the left earphone 34 connected to the coupling member 46. Note that, for example, when a Dolby (registered trademark) system is adopted, processing for the sound signal is performed. Different sounds, the frequencies or the like of which are varied, are respectively output from the right earphone 32 and the left earphone 34.

The direction specifying section 166 specifies a visual line direction of the user by analyzing the image of a right eye ER and the image of a left eye LE of the user picked up by the eye-image pickup cameras 37 and 38. As a method of specifying the visual line direction of the user based on the image of the right eye RE and the image of the left eye LE of the user picked up by the eye-image pickup cameras 37 and 38, various publicly-known techniques can be used. For example, the direction specifying section 166 can specify, on the basis of a database of images associated with visual line directions of the user stored in advance in the storing section 120, the visual line direction of the user by applying pattern matching or a statistical identification method to the picked-up images of the eyes.

The distance measuring section 168 applies the trigonometry to the target object included in the picked-up image of the first camera 61 and the target object included in the picked-up image of the second camera 62 to measure the distance to an image of the target object included in the picked-up images of the cameras 61 and 62. Note that, in this embodiment, the distance to the target object is measured by the first camera 61 and the second camera 62, which are stereo cameras, disposed in the different places. However, in other embodiments, the distance to the target object may be measured by different measuring means such as a TOF (Time Of Flight) sensor.

The image setting section 165 performs various kinds of setting of an image (a display image) that the image setting section 165 causes the image display section 20 to display. For example, the image setting section 165 sets a display position of the display image, the size of the display image, the luminance of the display image, and the like and sets image data for right eye and image data for left eye to form a binocular parallax (simply referred to as "parallax" as well) in order to cause the user to three-dimensionally (3D) recognize the display image as a three-dimensional image. The image setting section 165 applies pattern matching or the like to the picked-up images to extract an image of a detection target set in advance from the picked-up images.

In this embodiment, even if an image is based on the same image data, the image setting section 165 causes the image display section 20 to display a different image according to a relation between the specified visual line direction of the user and the position of an image region where the image is displayed. For example, the image setting section 165 causes the image display section 20 to display, on the basis of three-dimensional image data having color information of RGB (Red, Green, Blue), in a predetermined range of a visual field centering on a gazing point of the user, the image as a three-dimensional image having the color information of RGB and formed using measured distance information. On the other hand, the image setting section 165 causes the image display section 20 to display, on the basis of the three-dimensional image data, outside the predetermined range of the visual field, the image as a two-dimensional image having color information of only white and black. Concerning a relation between the visual line direction and the position of the image region, the image setting section 165 reads, via the ROM, a lookup table for determining correspondence concerning how different images are displayed even if image data are the same to determine an image that the image setting section 165 causes the image display section 20 to display.

Figure 3:
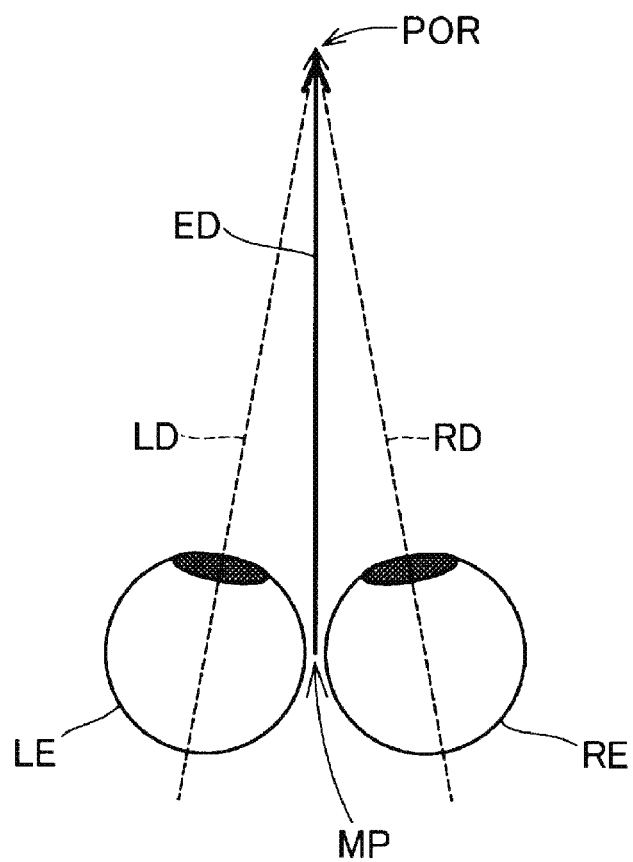
FIG. 3 is an explanatory diagram of a relation between a gazing point and a visual line direction of a user.

FIG. 3 is an explanatory diagram of a relation between a gazing point POR and a visual line direction ED of the user. In FIG. 3, the visual line direction ED at the time when the right eye RE and the left eye LE of the user view the gazing point POR is shown. In this embodiment, a direction from a left and right eyeball center MP, which is the intermediate point between the right eye RE and the left eye LE, to the gazing point POR is defined as the visual line direction ED. Note that the definition of the visual line direction ED of the user can be variously modified. For example, a direction from a dominant eye to the gazing point POR may be defined as the visual line direction ED.

A human can visually recognize a target present in a visual field, which is a fixed range centering on the gazing point POR. In general, the human can more clearly visually recognize a target present at a distance same as the distance to the gazing point POR and present in a position closer to the gazing point POR. There are various forms as a visual characteristic in which visibility of the human changes according to in which range of the visual field the target is present. For example, there is a visual characteristic in which the human can clearly visually recognize the contour of the target up to a certain range of the visual field but, in ranges of the visual field other than the range, although the human can recognize the presence of the target, the human cannot grasp the contour of the target. Note that the same applies to a display image serving as the target. In other words, an ability of the human for recognizing the target object included in the visual field decreases as the target object is further away from the gazing point POR. Therefore, in this embodiment, concerning an image displayed in a position away from the visual line direction ED of the user, even if the image is based on the same image data, the image setting section 165 reduces, for example, with means for reducing the resolution of the image, processing for causing the image display section 20 to display the image and causes the image display section 20 to display the image. Note that the image setting section 165 is equivalent to the image changing section in the appended claims.

A region within approximately 5 degrees centering on the gazing point POR is called discrimination visual field excellent in a visual function such as vision. A region within approximately 30 degrees in the horizontal direction centering on the gazing point POR and within approximately 20 degrees in the vertical direction centering on a visual point is called effective visual field in which a target can be instantaneously visually recognized only with an eye movement. A region within approximately 60 to 90 degrees in the horizontal direction centering on the gazing point POR and within approximately 45 to 70 degrees in the vertical direction centering on the visual point is called stable gazing visual field in which the user can reasonably recognize a target by performing an eye movement for moving the eyeballs or a head movement.

Figure 4:
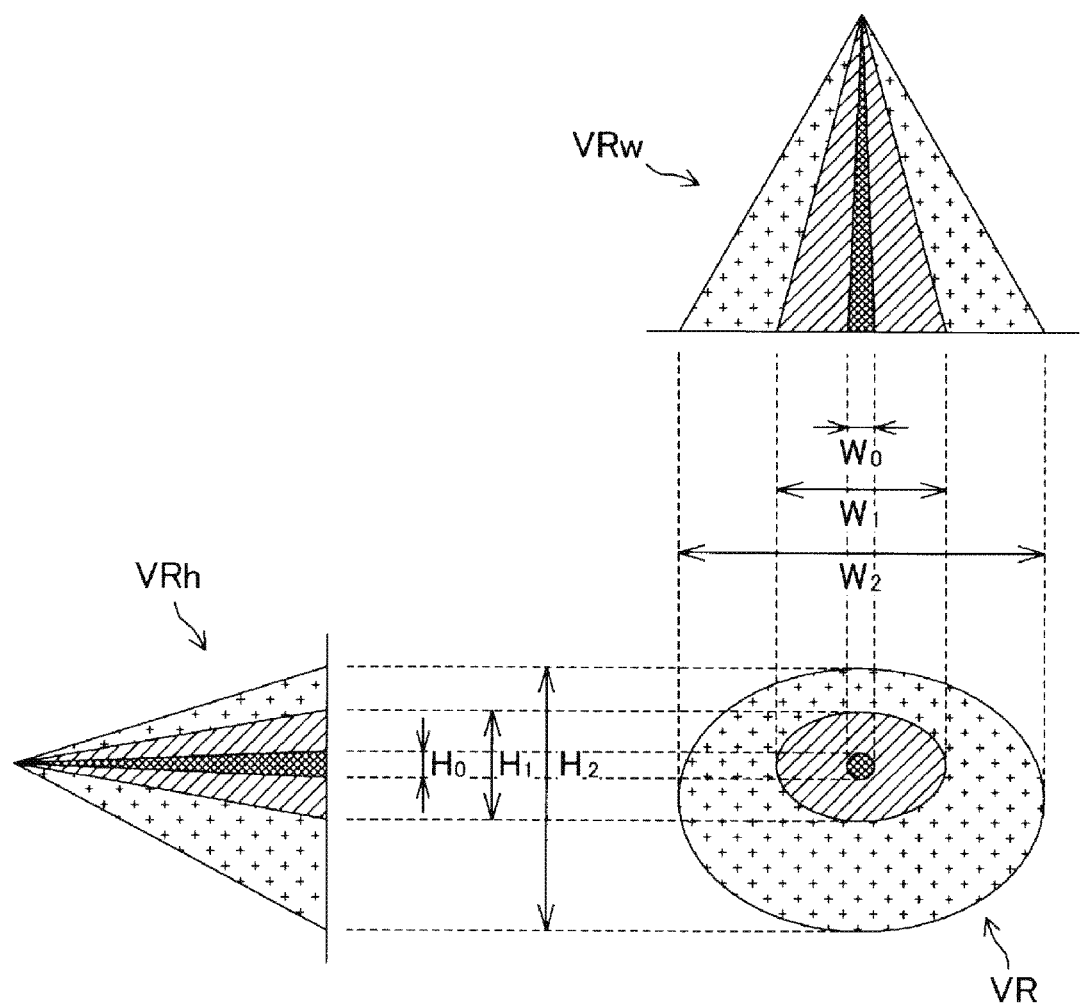
FIG. 4 is a schematic diagram of a horizontal visual field and a vertical visual field centering on the gazing point.

FIG. 4 is a schematic diagram of a horizontal visual field VRw and a vertical visual field VRh centering on the gazing point POR. In FIG. 4, a relation among discrimination visual fields, effective visual fields, and stable gazing visual fields in the horizontal direction and the vertical direction is shown. In FIG. 4, a visual field VR that can be visually recognized centering on the gazing point POR when the user is viewing the gazing point POR, the horizontal visual field VRw for explaining the visual field VR by dividing the visual field VR into horizontal direction components, and the vertical visual field VRh for explaining the visual field VR by dividing the visual field VR into vertical direction components are shown. In FIG. 4, the discrimination visual fields, the effective visual fields, and the stable gazing visual fields are represented in a relation (1) described below. Note that angles in parentheses in the relation (1) are angles on one side centering on the gazing point POR.

Discrimination visual fields: W0, H0 (up to approximately 5 degrees)

Effective visual fields: W1 (up to approximately 30 degrees), H1 (up to approximately 20 degrees)

Stable gazing visual fields: W2 (up to approximately 60 (90) degrees), H2 (up to approximately 45 (70) degrees)

(1)

As shown in FIG. 4, in the vertical direction of the visual field VR, the stable gazing visual field or the like on the lower side is a wide range rather than on the upper side. This indicates that it is easier for the human to visually recognize the lower side than the upper side along the vertical direction.

Figure 5:
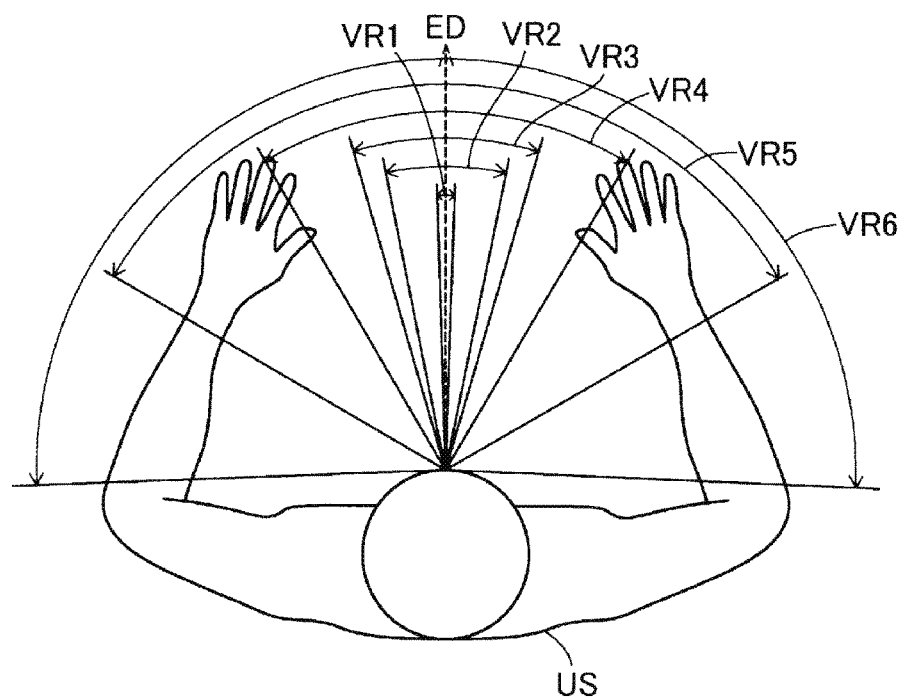
FIG. 5 is an explanatory diagram showing a degree of human recognition in each of ranges of a visual field in the horizontal visual field.

FIG. 5 is an explanatory diagram showing a degree of visual recognition of the human in each of ranges of the visual fields in the horizontal visual field VRw. In FIG. 5, a visual field range VR1 to a visual field range VR6 distinguished into six centering on the visual line direction ED of a user US are shown. A relation (2) described below holds. Note that angles in parentheses in the relation (2) are angles on one side centering on the gazing point POR.

VR1: A range regarded as the gazing point POR (up to approximately 1 degree)

VR2: A range in which characters can be identified (up to approximately 10 degrees)

VR3: A range in which an eye movement can be easily performed (up to approximately 15 degrees)

VR4: A range in which a shape can be identified (up to approximately 30 degrees)

VR5: A range in which color information can be identified (up to approximately 60 degrees)

VR6: A limit of a visual field (up to approximately 94 degrees)

(2)

As shown in FIG. 5, information that the user US can recognize is different according to a visual field.

Figure 6:
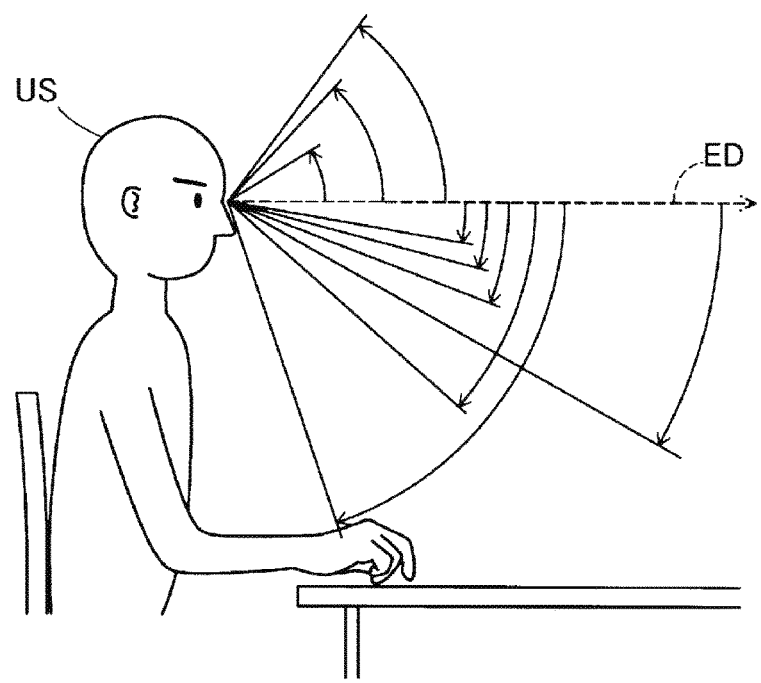
FIG. 6 is an explanatory diagram showing a degree of human recognition in each of ranges of a visual field in the vertical visual field.

FIG. 6 is an explanatory diagram showing a degree of recognition of the human in each of ranges of visual field in the vertical visual field VRh. In FIG. 6, distinguished visual fields of the user US concerning the vertical visual field VRh replacing the horizontal visual field VRw in FIG. 5 are shown. Therefore, explanation concerning what kinds of visual field ranges the distinguished visual field ranges are is omitted.

The interface 180 shown in FIG. 2 is an interface for connecting various external apparatuses OA, which function as supply sources of contents, to the control section 10. Examples of the external apparatuses OA include a personal computer (PC), a cellular phone terminal, and a game terminal. As the interface 180, for example, a USB interface, a micro USB interface, and an interface for a memory card can be used.

The image display section 20 includes the right display driving section 22, the left display driving section 24, the right light guide plate 261 functioning as the right optical-image display section 26, the left light guide plate 262 functioning as the left optical-image display section 28, the first camera 61, and the second camera 62.

The right display driving section 22 includes a receiving section 53 (Rx 53), the right backlight control section 201 (right BL control section 201) and the right backlight 221 (right BL 221) functioning as a light source, the right LCD control section 211 and the right LCD 241 functioning as a display element, and the right projection optical system 251. The right backlight control section 201 and the right backlight 221 function as the light source. The right LCD control section 211 and the right LCD 241 function as the display element. Note that the right backlight control section 201, the right LCD control section 211, the right backlight 221, and the right LCD 241 are collectively referred to as "image-light generating section" as well.

The receiving section 53 functions as a receiver for serial transmission between the control section 10 and the image display section 20. The right backlight control section 201 drives the right backlight 221 on the basis of an input control signal. The right backlight 221 is, for example, a light emitting body such as an LED or an electroluminescence (EL) element. The right LCD control section 211 drives the right LCD 241 on the basis of the clock signal PCLK, the vertical synchronization signal VSync, the horizontal synchronization signal HSync, and the image data for right eye input via the receiving section 53. The right LCD 241 is a transmissive liquid crystal panel on which a plurality of pixels are disposed in a matrix shape.

The right projection optical system 251 is configured by a collimate lens that changes the image light emitted from the right LCD 241 to light beams in a parallel state. The right light guide plate 261 functioning as the right optical-image display section 26 guides the image light output from the right projection optical system 251 to the right eye RE of the user while reflecting the image light along a predetermined optical path. Note that the right projection optical system 251 and the right light guide plate 261 are collectively referred to as "light guide section" as well.

The left display driving section 24 includes a configuration same as the configuration of the right display driving section 22. The left display driving section 24 includes a receiving section 54 (Rx 54), the left backlight control section 202 (left BL control section 202) and the left backlight 222 (left BL 222) functioning as a light source, the left LCD control section 212 and the left LCD 242 functioning as a display element, and the left projection optical system 252. The left backlight control section 202 and the left backlight 222 function as the light source. The left LCD control section 212 and the left LCD 242 function as the display element. Note that the left backlight control section 202, the left LCD control section 212, the left backlight 222, and the left LCD 242 are collectively referred to as "image-light generating section" as well. The left projection optical system 252 is configured by a collimate lens that changes image light emitted from the left LCD 242 to light beams in a parallel state. The left guide plate 262 functioning as the left optical-image display section 28 guides the image light output from the left projection optical system 252 to the left eye LE of the user while reflecting the image light along a predetermined optical path. Note that the left projection optical system 252 and the left light guide plate 262 are collectively referred to as "light guide section" as well.

Figure 7:
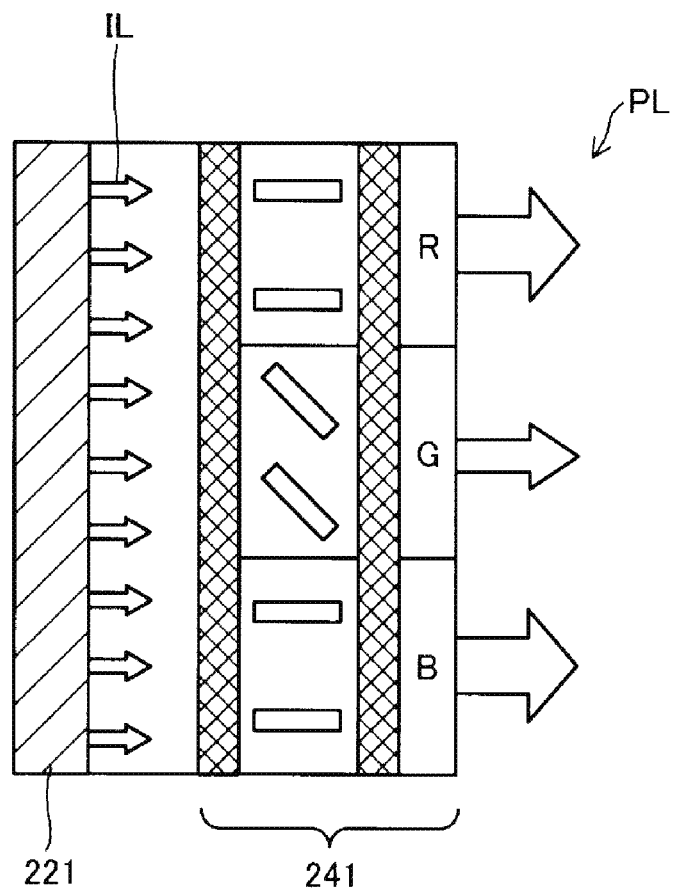
FIG. 7 is an explanatory diagram showing a state in which image light is emitted by an image-light generating section.

FIG. 7 is an explanatory diagram showing a state in which image light is emitted by the image-light generating section. The right LCD 241 changes, by driving liquid crystal in pixel positions disposed in a matrix shape, the transmittance of light transmitted through the right LCD 241 to thereby modulate illumination light IL radiated from the right backlight 221 into effective image light PL representing an image. The same holds true concerning the left side. Note that, as shown in FIG. 2, a backlight system is adopted in this embodiment. However, image light may be emitted using a front light system or a reflection system.

A-2. Image Display Processing

Figure 8:
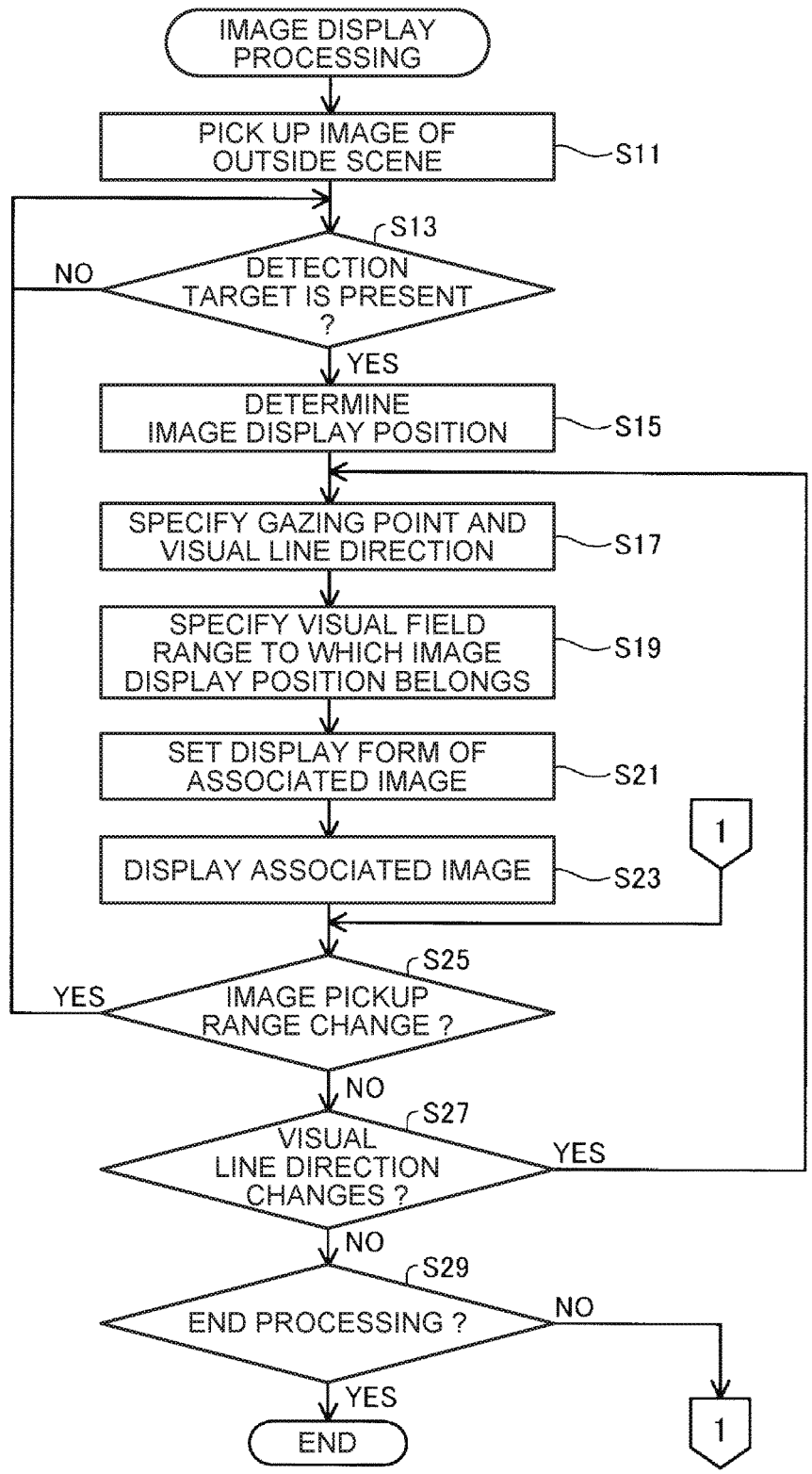
FIG. 8 is a flowchart for explaining a flow of image display processing.

FIG. 8 is a flowchart for explaining a flow of image display processing. The image display processing is processing in which, when causing the image display section 20 to display an associated image associated with a detection target detected from the picked-up images of the cameras 61 and 62, the CPU 140 changes a display image on the basis of visual field range distinguished centering on the visual line direction ED of the user and a display position of an image and causes the image display section 20 to display the display image.

In the image display processing, first, the image setting section 165 picks up images of an outside scene using the cameras 61 and 62 (step S11). The image setting section 165 detects, from the picked-up images of the cameras 61 and 62, with pattern matching or the like, a detection target associated with an associated image that the image setting section 165 causes the image display section 20 to display (step S13). If the detection target is not detected from the picked-up images (NO in step S13), the image setting section 165 continuously stands by for detection of the detection target from the picked-up images (step S13).

If detecting the detection target from the picked-up images in the processing in step S13 (YES in step S13), the image setting section 165 determines an image display position where the image setting section 165 causes the image display section 20 to display an associated image associated with the detection target in advance (step S15). The image display position of the associated image can be variously determined. For example, the associated image is displayed in a fixed position in an image display maximum region PN where the image display section 20 can display an image irrespective of the position of the detection target in the picked-up image or the associated image is displayed in the vicinity of the position of a feature point set in the detection target. Note that the image display maximum region PN is equivalent to the display region in the appended claims.

When the image display position of the associated image is determined (step 15), the CPU 140 specifies, using the picked-up images of the eye-image pickup cameras 37 and 38, the gazing point POR and the visual line direction ED of the user wearing the image display section 20 on the head (step S17). The CPU 140 specifies the distance to the detection target measured by the distance measuring section 168 using the picked-up images of the cameras 61 and 62 and the visual line direction ED of the user specified by the direction specifying section 166 using the picked-up images of the eye-image pickup cameras 37 and 38.

The image setting section 165 specifies to which visual field range among a plurality of visual field ranges set on the basis of the specified visual line direction ED the image display position in the image display maximum region PN of the associated image belongs (step S19). For example, as shown in FIG. 5, the image setting section 165 distinguishes the plurality of visual field ranges centering on the specified visual line direction ED and specifies to which of the distinguished visual field ranges the image display position belongs.

Figure 9:
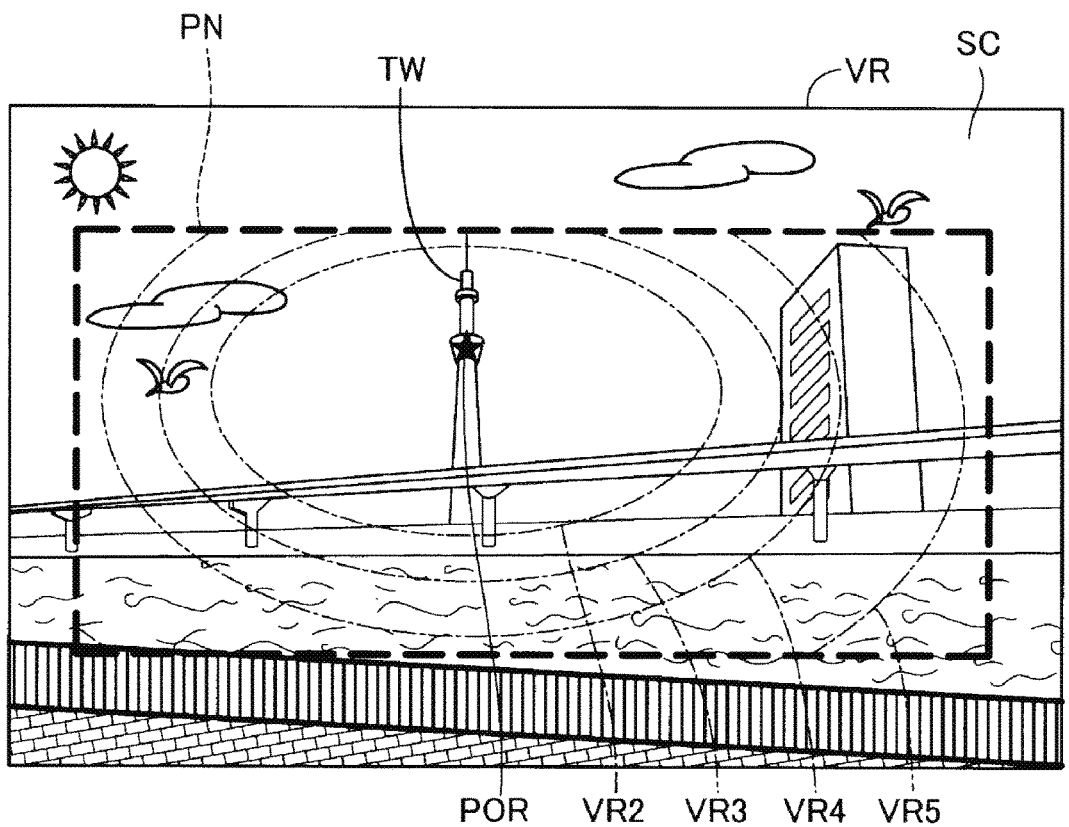
FIG. 9 is an explanatory diagram showing a relation between an image display position of an associated image and distinguished visual field ranges.

FIG. 9 is an explanatory diagram showing a relation between an image display position of an associated image IM1 and distinguished visual field ranges. In FIG. 9, an example of the visual field VR visually recognized by the user is shown. As shown in FIG. 9, the user can visually recognize an outside scene SC transmitted through the optical-image display sections 26 and 28. The outside scene SC includes "Sky Tree", which is one of landmarks, as a detection target TW. In FIG. 9, the gazing point POR of the user specified by the CPU 140 and the visual field ranges VR2, VR3, VR4, and VR5 set in a predetermined range centering on the gazing point POR are shown. Note that the visual field range VR3 refers to a range included in the visual field range VR3 and not included in the visual field range VR2. Similarly, the visual field range VR4 refers to a range included in the visual field range VR4 and not included in the visual field ranges VR2 and VR3. The visual field range VR5 refers to a range included in the visual field range VR5 and not included in all of the visual field ranges VR2, VR3, and VR4. In FIG. 9, for convenience of explanation, a broken line indicating the image display maximum region PN, a star mark indicating the gazing point POR, and alternate long and short dash lines indicating the visual field ranges are shown. However, the broken line, the star mark, and the alternate long and short dash lines are not visually recognized by the user. In this embodiment, a picked-up image equivalent to a visual field visually recognized by the user is created by the picked-up images of the cameras 61 and 62. Therefore, the created picked-up image and the visual field VR of the user coincide with each other. In other embodiments, a picked-up image and the visual field VR of the user may be different.

After performing the processing in step 19 in FIG. 8, the image setting section 165 sets a display form of the associated image that the image setting section 165 causes the image display section 20 to display in the image display maximum region PN on the basis of image data of an associated image associated with the detection target TW (step S21). In this embodiment, even if the display image is based on the same image data, the image setting section 165 changes setting of a form of the display image according to a position where the associated image is displayed in the image display maximum region PN. After setting the display form of the associated image IM1, the image setting section 165 causes the image display section 20 to display the associated image IM1, the display form of which is set, in the image display maximum region PN (sep S23).

Figure 10:
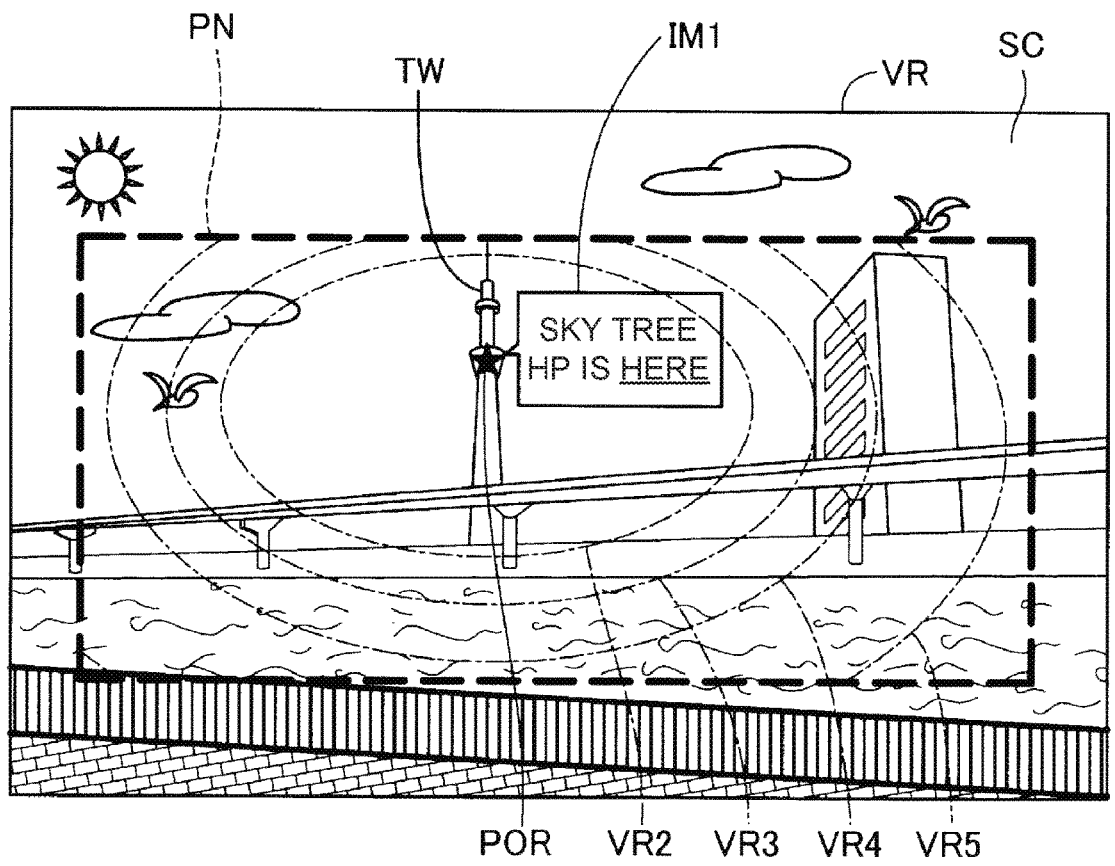
FIG. 10 is an explanatory diagram showing an example of a visual field of the user at the time when the associated image is displayed.

FIG. 10 is an explanatory diagram showing an example of the visual field VR of the user at the time when the associated image IM1 is displayed. As shown in FIG. 10, the visual field VR of the user includes the outside scene SC that the user can visually recognize through the optical-image display sections 26 and 28 and the associated image IM1 displayed in the image display maximum region PN. The associated image IM1 is an image displayed in the image display maximum region PN in association with the detection target TW detected from the picked-up images. The associated image IM1 is set in advance to be displayed near the detection target TW not to overlap the detection target TW. In particular, when the specified gazing point POR of the user overlaps the detection target TW, the associated image IM1 is displayed according to the position of the specified gazing point POR. Note that the detection target TW is equivalent to the specific target object in the appended claims.

The image setting section 165 specifies a positional relation between an image display position where the associated image IM1 associated with the position of the specified gazing point POR is displayed and the visual field ranges. When specifying that at least a part of the associated image IM1 is included in the visual field range VR2 closest to the gazing point POR, the image setting section 165 sets, as a display form of an image displayed on the basis of image data of the associated image IM1, a display form representing the image data of the associated image IM1 most in detail. The image setting section 165 causes the image display section 20 to display, as the associated image IM1 in the set display form, an image satisfying all of contents (A) to (C) below in the image display maximum region PN.

(A) A character image
(B) A three-dimensional image (including distance information)
(C) An image including color information of RGB The associated image IM1 in the set display form includes character images. The associated image IM1 is displayed in the image display maximum region PN as a three-dimensional image visually recognized at a distance same as the distance to the detection target TW. "Here" underlined among the character images included in the associated image IM1 is displayed in a color (e.g., blue) different from a color of the other character images in order to indicate that "here" can be selected by moving a cursor or the like separately displayed in the image display maximum region PN. When "here" included in the associated image IM1 is selected by predetermined operation received by the operation section 135, the CPU 140 is connected to a home page (HP) of the detection target TW via the radio communication section 132. Note that, in this embodiment, when image display positions of the associated image IM1 are included in a plurality of visual field ranges, the image setting section 165 causes the image display section 20 to display the associated image IM1 in the image display maximum region PN in a form in which the associated image IM1 is displayed when the entire associated image IM1 is included in a visual field range on the innermost side. Note that, in the other embodiments, various modifications are possible concerning specifying which of the visual field ranges a display position of the associated image IM1 is included. For example, a visual field including a largest number of display regions in an image may be specified as the visual field range for setting the display form. The visual field range VR2 is equivalent to the first visual field range in the appended claims. The visual field ranges other than the visual field range VR2 is equivalent to the second visual field range in the appended claims.

In step S23 in FIG. 8, when the associated image IM1 is displayed in the image display maximum region PN, the CPU 140 monitors a change in the image pickup ranges of the cameras 61 and 62 (step S25). If detecting a change in the image pickup ranges of the cameras 61 and 62 (YES in step S25), the CPU 140 repeats the processing in step S13 and subsequent steps. Note that the CPU 140 may use a predetermined threshold and, if the change in the image pickup ranges of the cameras 61 and 62 is a change equal to or smaller than the predetermined threshold, regard that there is no change in the image pickup ranges of the cameras 61 and 62.

Figure 11:
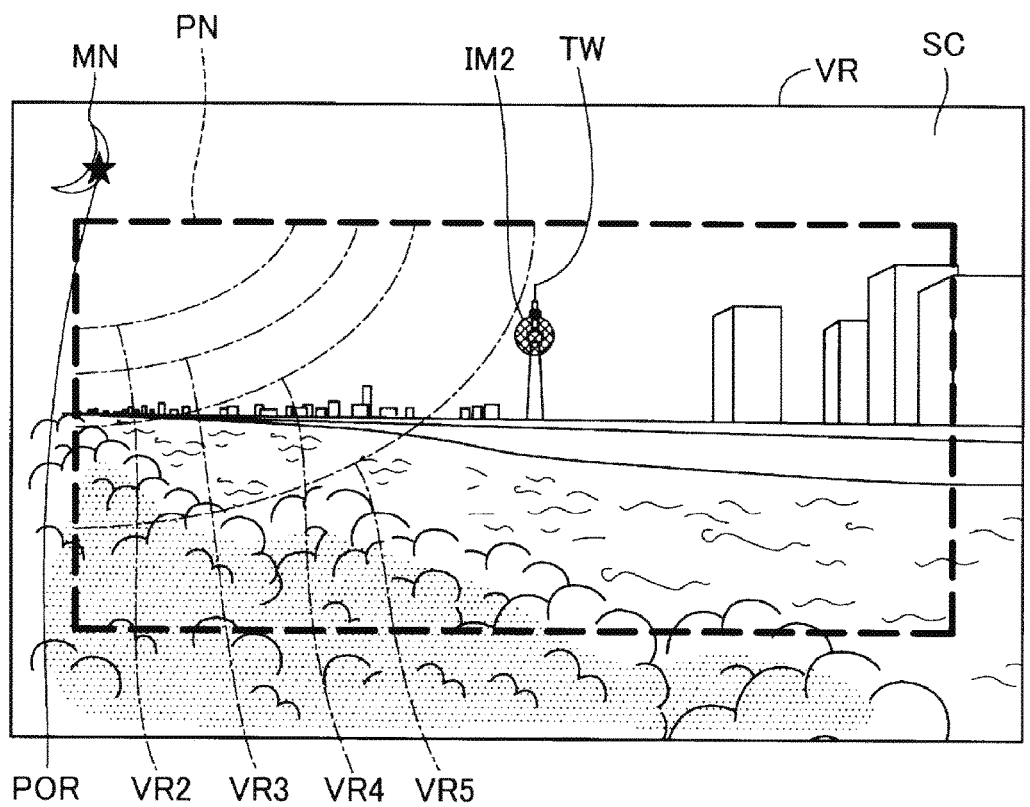
FIG. 11 is an explanatory diagram showing an example of a visual field of the user at the time when an associated image after a change in image pickup ranges of cameras is displayed.

FIG. 11 is an explanatory diagram showing an example of the visual field VR of the user at the time when an associated image IM2 after the change in the image pickup ranges of the cameras 61 and 62 is displayed. In FIG. 11, compared with FIG. 10, the user is present in a position further away than the detection target TW. The visual field VR is shown in which the gazing point POR of the user is a moon MN included in the outside scene SC. That is, in FIG. 11, compared with FIG. 10, the gazing point POR of the user also changes. In the example shown in FIG. 11, the detection target TW detected from the picked-up images of the cameras 61 and 62 is included in a range further on the outer side than the visual field range VR5. In this case, the image setting section 165 sets, as a display form of an image that the image setting section 165 causes the image display section 20 to display in the image display maximum region PN on the basis of image data of the associated image IM2 same as the associated image IM1, a display form not including distance information in which only the position of the detection target TW is simplified. As shown in FIG. 11, the image setting section 165 causes the image display section 20 to display, as the simplified associated image IM2 based on the image data of the associated image IM2, in an infinite distant position in the image display maximum region PN, the associated image IM2, which is an image of a circle, overlapping the position of the detection target TW. In this embodiment, the image setting section 165 causes the image display section 20 to display, as an associated image of the detection target TW included in the visual field range VR5, in the image display maximum region PN, an image only representing the position of the detection target TW. Note that the range further on the outer side than the visual field range VR5 is equivalent to the eighth visual field range in the appended claims. The visual field range including the visual field range VR5 and further on the inner side than the visual field range VR5 is equivalent to the seventh visual field range in the appended claims.

When the associated image IM2 is displayed in step S23 in FIG. 8, the CPU 140 monitors a change in the image pickup ranges of the cameras 61 and 62 (step S25). If determining that there is no change in the image pickup ranges of the cameras 61 and 62 (NO in step S25), the CPU 140 monitors a change in the visual line direction ED of the user (step S27). If determining that the visual line direction ED of the user changes (YES in step S27), the CPU 140 repeats the processing in step S17 and subsequent steps.

Figure 12:
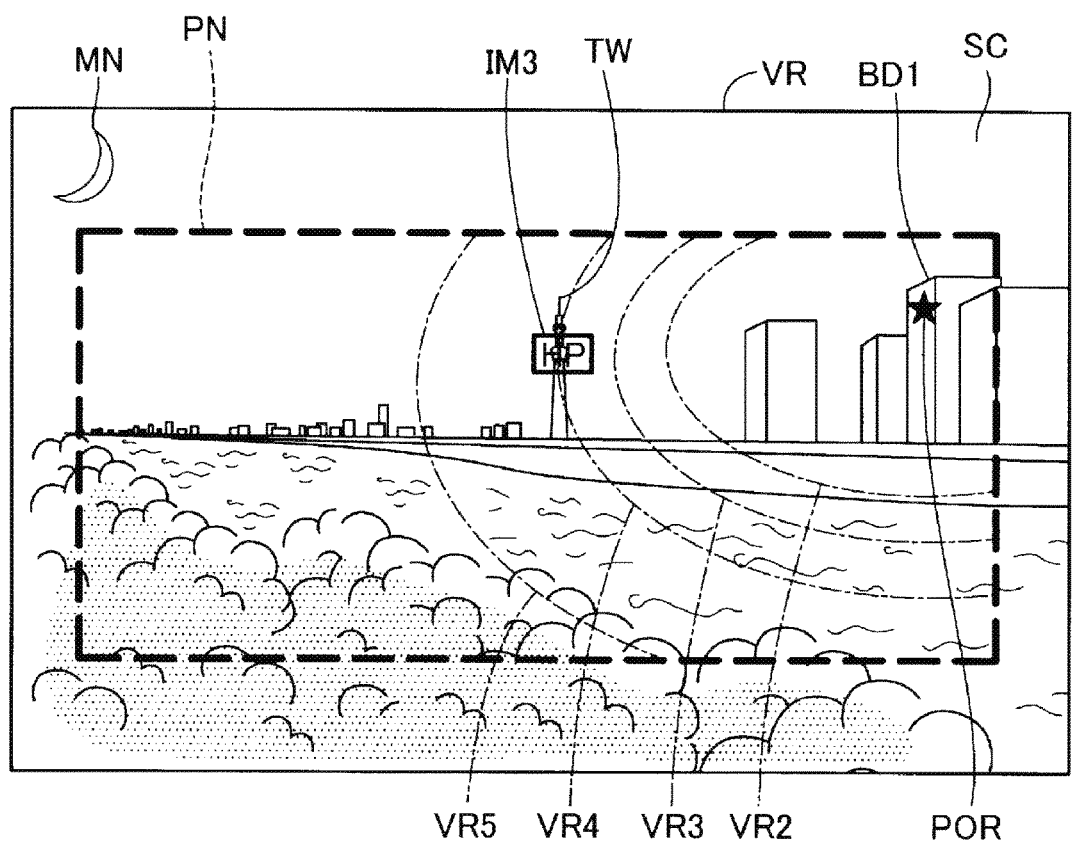
FIG. 12 is an explanatory diagram showing an example of a visual field recognized by the user when an associated image after a change in the visual line direction of the user is displayed.

FIG. 12 is an explanatory diagram showing an example of the visual field VR visually recognized by the user when an associated image IM3 after the change in the visual line direction ED of the user is displayed. In FIG. 12, compared with FIG. 11, the visual field VR at the time when the gazing point POR of the user changes is shown. In the example shown in FIG. 12, the gazing point POR of the user is a building BD1 included in the outside scene SC. The position of the detection target TW in the picked-up images of the cameras 61 and 62 is included in the visual field range VR4 and the visual field range VR5. Therefore, the image setting section 165 determines that the detection target TW belongs to the visual field range VR4 and sets a display form of an image that the image setting section 165 causes the image display section 20 to display in the image display maximum region PN on the basis of image data of the associated image IM3, which is image data same as the image data of the associated image IM1 associated with the detection target TW. The image setting section 165 causes the image display section 20 to display, on the basis of the set display form, the associated image IM3 linked to the home page (HP) and functioning as a selectable button in the image display maximum region PN as an image having the same color as "here" of the associated image IM1 in FIG. 10 and visually recognized at an infinite distance. In other words, the image setting section 165 causes the image display section 20 to display the associated image IM3 in the image display maximum region PN as an image not including (A) contents of the character images and (B) contents of the three-dimensional image including the distance information and including (C) the color information of RGB in the associated image IM1 shown in FIG. 10. Note that the visual field range VR4 is equivalent to the fourth visual field range in the appended claims. The visual field range further on the inner side than the visual field range VR4 is equivalent to the third visual field range in the appended claims.

When the associated image IM3 is displayed in the image display maximum region PN in the processing in step S23 in FIG. 8, the CPU 140 monitors a change in the image pickup ranges of the cameras 61 and 62 (step S25). If determining that there is no change in the image pickup ranges of the cameras 61 and 62 (NO in step S25), the CPU 140 monitors a change in the visual line direction ED of the user (step S27). If determining that there is no change in the visual line direction ED of the user US (NO in step S27), the CPU 140 monitors predetermined operation for ending the image display processing on the operation section 135 (step S29). If the predetermined operation for ending the image display processing is not received (NO in step S29), the CPU 140 repeats the processing in step S25 and subsequent steps. If the predetermined operation for ending the image display processing is received in the processing in step S29 (YES in step S29), the CPU 140 ends the image display processing.

In the HMD 100 in this embodiment, the image setting section 165 causes the image display section 20 to display, on the basis of a relation between the specified visual line direction ED of the user and the display position of the associated image, even image data of the same associated image in the image display maximum region PN as a different image. Therefore, in the HMD 100 in this embodiment, it is possible to increase speed of processing for displaying the associated image without reducing easiness of recognition of the user who visually recognizes the associated image.

In the HMD 100 in this embodiment, the image setting section 165 sets the image display position of the associated image in association with the position of the detection target TW detected from the picked-up images of the cameras 61 and 62. Therefore, in the HMD 100 in this embodiment, it is possible to cause the user to more clearly visually recognize a correspondence relation between the detection target TW and the associated image. Convenience of use for the user is improved.

In the HMD 100 in this embodiment, the visual line direction ED of the user is specified by the picked-up images of the eye-image pickup cameras 37 and 38. Therefore, it is possible to accurately specify the visual line direction ED and the gazing point POR of the user.

In the HMD 100 in this embodiment, in the visual field range VR2, the image setting section 165 causes the image display section 20 to display, on the basis of the image data of the associated image IM1, in the image display maximum region PN, the associated image IM1 including the character images. On the other hand, in the visual field range further on the outer side than the visual field range VR2, the image setting section 165 causes the image display section 20 to display, on the basis of the image data of the associated image IM1, in the image display maximum region PN, the associated image (e.g., the associated image IM2) not including the character images. Therefore, in the HMD 100 in this embodiment, in the visual field range in which it is hard for the user to visually recognize characters, the associated image not including the character images is displayed on the image display section 20. Therefore, it is possible to increase speed of the processing for displaying the associated image without further reducing the easiness of the recognition of the user who visually recognizes the associated image.

In the HMD 100 in this embodiment, in the visual field range VR5, the image setting section 165 causes the image display section 20 to display, on the basis of the image data of the associated image IM1, the associated image IM2, which is the simplified image of the circle, in the image display maximum region PN. Therefore, in the HMD 100 in this embodiment, in the visual field range in which the user cannot recognize detailed content of the display image, only the simplified image indicating only that the image is present is displayed on the image display section 20. Therefore, it is possible to further increase the speed of processing for displaying the associated image without reducing the easiness of the recognition of the user who visually recognizes the associated image.

In the HMD 100 in this embodiment, in the visual field range VR4, the image setting section 165 causes the image display section 20 to display, on the basis of the image data of the associated image IM1, the associated image IM3, which serves as a two-dimensional image not including distance information, in the image display maximum region PN irrespective of the distance to the gazing point POR of the user. Therefore, in the HMD 100 in this embodiment, the image setting section 165 causes the image display section 20 to display the two-dimensional image in the visual field range in which it is hard for the user to recognize the distance to the display image. Therefore, it is possible to further increase the speed of the processing for displaying the associated image without reducing the easiness of the recognition of the user who visually recognizes the associated image.

B. Second Embodiment

In an HMD 100a in a second embodiment, compared with the HMD 100 in the first embodiment, a visual field range VR2 used by an image setting section 165a to set a display form of an associated image is different. Otherwise, the HMD 100a is the same as the HMD 100 in the first embodiment.

In the second embodiment, the visual field range VR2 is determined taking into account an eye movement of a human. It is known that the eye movement of the human is classified into three movements, that is, an involuntary eye movement during fixation, a following movement, and a saccade. Even when the human is gazing at a specific target object, a visual line of the human is actually moving. Such an involuntary movement is referred to as involuntary eye movement during fixation. The following movement is a movement that tracks, when the human is viewing a moving target object, the movement of the target object. Speed of the following movement is approximately 30 degree/s (dps) at most. The saccade refers to a wiggling high-speed movement of eyeballs. For example, when the human is reading a book, a movement for quickly moving a visual line to the left end, which is the beginning of a line-fed sentence, after reading to the right end of a horizontally written sentence corresponds to the saccade. Speed of the eyeballs by the saccade is approximately 300 to 600 dps. Approximately 160 to 170 milliseconds (ms) is required for an initial movement of the saccade. When a distance of the saccade is represented by a visual angle, although there is an individual difference, the visual angle is approximately 2 to 6 degrees. In the second embodiment, the image setting section 165a sets a visual field range VR2S, which is obtained by adding the visual angle by the saccade to the visual field range VR2 in the first embodiment, the same as the display form in the visual field range VR2 in the first embodiment.

Figure 13:
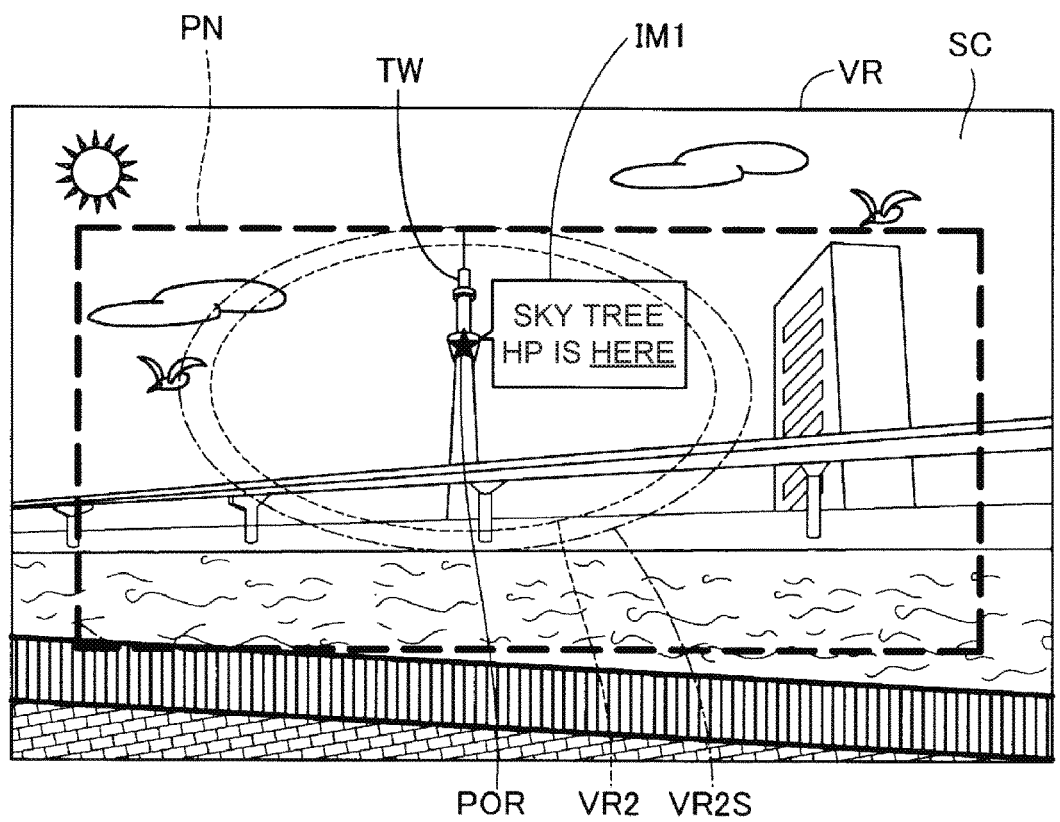
FIG. 13 is an explanatory diagram for comparing a visual field range in the first embodiment and a visual field range in a second embodiment.

FIG. 13 is an explanatory diagram for comparing the visual field range VR2 in the first embodiment and the visual field range VR2S in the second embodiment. Note that, in FIG. 13, the visual field ranges VR3, VR4, and VR5 shown in FIG. 10 in the first embodiment are not shown and the visual field range VR2S is shown anew. In FIG. 13, for comparison with the first embodiment, for convenience, the visual field range VR2 in the first embodiment is indicated by a broken line.

Even if the detection target TW is on the outer side of the visual field range VR2 in the first embodiment, if the detection target TW is on the inner side of the visual field range VR2, the image setting section 165a in the second embodiment causes the image display section 20 to display the associated image IM1 in the image display maximum region PN as an image associated with the detection target TW. In other words, in the second embodiment, the visual field region displayed as the associated image IM1 when the detection target TW is detected is expanded from the visual field range VR2 to the visual field range VR2S.

As explained above, in the HMD 100a in the second embodiment, the image setting section 165a changes the display form of the associated image using the saccade serving as the visual characteristic, which is the eye movement of the human. Therefore, in the HMD 100a in the second embodiment, as in the first embodiment, in a region further on the outer side than the visual field range VR2S, processing necessary for causing the image display section 20 to display the associated image associated with the detection target TW in the image display maximum region PN is reduced. Further, in the region of the visual field range VR2S, the associated image IM1 is displayed in the image display maximum region PN. Therefore, even if the gazing point POR changes to the outer side of the visual field range VR2 in the first embodiment according to the saccade, if the gazing point POR is on the inner side of the visual field range VR2S, a delay is not caused in the display of the associated image. Consequently, convenience of use of the HMD 100a is improved for the user.

C. Third Embodiment

In an HMD 100b in a third embodiment, when an image setting section 165b sets an associated image in the image display maximum region PN, the image setting section 165b sets a display form of the associated image taking into account movement characteristics of a visual recognition target gazed by a user and a range other than the visual recognition target in addition to the visual line direction ED and the detection target taken into account in the embodiments explained above. Examples of the movement characteristics taken into account include a sense felt by the user, for example, when the visual recognition target stands still and a background of the visual recognition target is moving with respect to the visual recognition target. Specifically, for example, although the user riding on a train visually recognizes, as the visual recognition target, an advertisement stuck to a window of the train, the user senses as if a scene on the outside of the traveling train is moving. In this way, a human sensing that the human is moving with respect to the human is referred to as receiving a motion stimulus. On the other hand, the human sensing that the human stands still with respect to the human is referred to as receiving a standstill stimulation. In general, it is known that the human senses that the human is moving when the human receives the standstill stimulus as the visual recognition target and receives the motion stimulus as a background around the visual recognition target. When the human receives the motion stimulus from the vicinity of the visual recognition target (in particular, before and after depth is set as a reference), the human senses that the human is moving. On the other hand, when the human receives the motion stimulus as the visual recognition target and receives the standstill stimulus as the background, the human senses that the human is not moving. In the HMD 100b in the third embodiment, a sensation of self-movement with which the user feels that the user is moving is caused and eliminated to give a realistic feeling to the user and suppress the realistic feeling of the user. In this specification, the background or the like recognized by the user as moving with respect to the visual recognition target recognized by the user as stopping is referred to as moving background as well.

Figure 14:
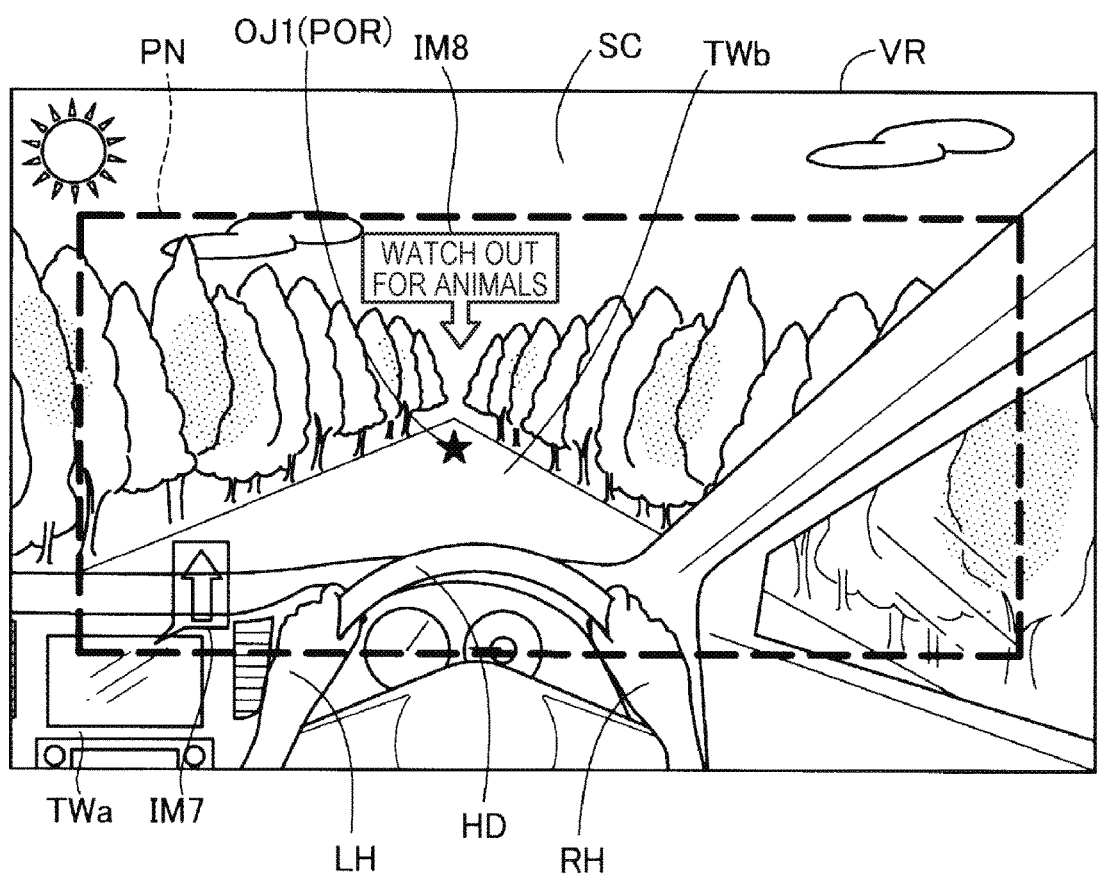
FIG. 14 is an explanatory diagram of a visual field visually recognized by a user who is driving an automobile in a third embodiment.

FIG. 14 is an explanatory diagram of the visual field VR visually recognized by the user who is driving an automobile in the third embodiment. As shown in FIG. 14, in the third embodiment, the user is visually recognizing a road in a forest serving as the outside scene SC and an associated image IM7 and an associated image IM8 displayed in the image display maximum region PN. The user is operating a steering wheel HD of the automobile with a right hand RH and a left hand LH and viewing the gazing point POR. The associated image IM7 is an image associated with a car navigation system (hereinafter simply referred to as "car navigation") mounted on the automobile serving as a detection target TWa. The associated image IM7 is an image with which the car navigation urges the user to travel straight forward on a route to a destination. The associated image IM7 is displayed in the image display maximum region PN as a simple arrow mark image (a mark) without information such as characters. The associated image IM8 is an image associated with the road serving as a detection target TWb included in the outside scene SC. The associated image IM8 is a character image "watch out for animals" for urging the user to pay attention to wild animals that are likely to jump out from roadsides.

In the third embodiment, the direction specifying section 166 can specify the distance to a visual recognition target OJ1 in addition to the visual line direction ED of the user by using a picked-up image of the right eye RE picked up by the right-eye-image pickup camera 37 and a picked-up image of the left eye LE picked up by the left-eye-image pickup camera 38. In an example shown in FIG. 14, the distance to the visual recognition target OJ1 specified by the direction specifying section 166 is 10 meters (m). That is, the user gazes, as the visual recognition target OJ1, the road included in the outside scene SC of the automobile. In this case, when the automobile is traveling, the user receives a motion stimulus from the road recognized as moving for the user. By sensing that a background near the road serving as the visual recognition target OJ1 is also moving, the user receives a motion stimulus from the background near the visual recognition target OJ1. Therefore, the user senses that the user is moving.

A distance measuring section 168b in the third embodiment can determine, using picked-up images of the outside scene picked up by the cameras 61 and 62 at a plurality of points in time (e.g., as a moving image), whether a specific target in the picked-up images is moving with respect to the cameras 61 and 62. The image setting section 165b sets, on the basis of presence or absence of the movement of the target in the respective picked-up images determined by the distance measuring section 168b, a display form of the associated image IM7 and a display form of the associated image IM8.

Since the user receives the motion stimulus from the visual recognition target OJ1, the image setting section 165b causes the image display section 20 to display, as an image including information such as characters, in the image display maximum region PN, the associated image IM8 associated with the detection target TWb that also gives the motion stimulus to the user. On the other hand, the detection target TWa disposed on the inside of the automobile driven by the user moves at speed same as the speed of the user. Therefore, the image setting section 165b gives a standstill stimulus to the user. The image setting section 165b causes the image display section 20 to display, as an image representing a mere mark, in the image display maximum region PN, the associated image IM7 associated with the detection target TWa that gives the standstill stimulus, which is different from the motion stimulus given to the user by the visual recognition target OJ1, to the user. To put it simply, in the HMD 100b in the third embodiment, the image setting section 165b sets display forms of the associated images IM7 and IM8 on the basis of a relation between the distance to the visual recognition target OJ1 serving as the visual line direction ED of the user and the speed with respect to the visual recognition target OJ1.

Figure 15:
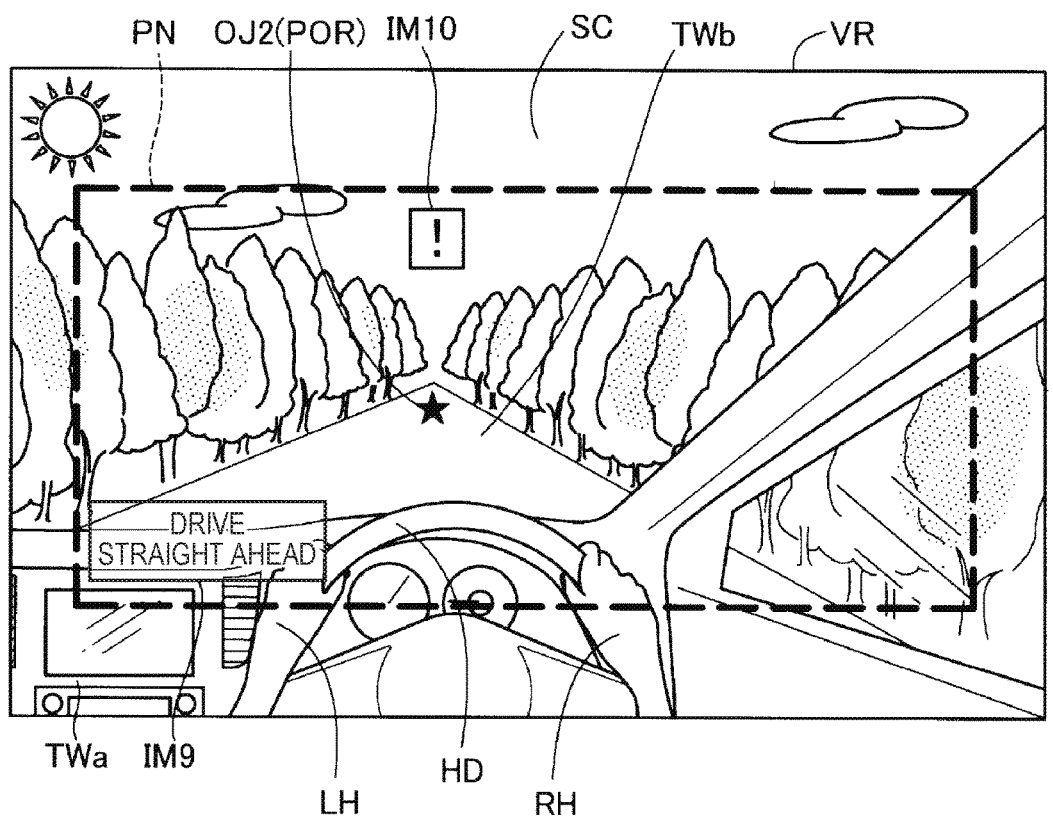
FIG. 15 is an explanatory diagram of a visual field visually recognized by the user who is driving the automobile in the third embodiment.

FIG. 15 is an explanatory diagram of the visual field VR visually recognized by the user who is driving the automobile in the third embodiment. As shown in FIG. 15, the user is visually recognizing the outside scene SC, the associated image IM8, and an associated image IM9. In an example shown in FIG. 15, the user is gazing a direction same as the visual line direction ED of the user shown in FIG. 14. In this case, in the example shown in FIG. 14 and the example shown in FIG. 15, the user is visually recognizing the same region in the image display maximum region PN where an image can be displayed. That is, the position of the detection target TWa and the position of the detection target TWb in FIG. 15 are the same as the position of the detection target TWa and the position of the detection target TWb in FIG. 14 on the basis of the visual line direction of the user.

In FIG. 15, a visual recognition target OJ2 gazed by the user is a windshield of the automobile 50 centimeters (cm) away from the user. In other words, the user is gazing at the visual recognition target OJ2 seen as moving and standing still together with the user. In the example shown in FIG. 15, the user receives a standstill stimulus from the visual recognition target OJ2, receives a standstill stimulus from the detection target TWa, and receives a motion stimulus from the detection target TWb. Therefore, the image setting section 165b sets an image also including character information as a display form of the associated image IM9 associated with the detection target TWa that gives the standstill stimulus same as the standstill stimulus of the visual recognition target OJ2 to the user. The associated image IM9 is a character image "drive straight ahead" with which the car navigation urges the user to drive straight ahead to guide the user to a destination. On the other hand, the image setting section 165b deletes character information and sets only "!", which is an exclamation mark for calling attention, as a display form of an associated image IM10 associated with the detection target TWb that gives a motion stimulus, which is different from the standstill stimulus of the visual recognition target OJ2, to the user. The simple display form in the appended claims is, for example, when two display images displayed in the image display maximum region PN are compared, shapes included in the display images are not more complicated (the shapes are, for example, a simple shape such as a circle or a cross), colors used in the display images are fewer, and regions of the display images are smaller (e.g., display with a smaller number of characters).

As explained above, in the HMD 100b in the third embodiment, the direction specifying section 166b specifies the distances to the visual recognition targets OJ1 and OJ2. The image setting section 165b sets, on the basis of the movement characteristics such as the standstill stimulus and the motion stimulus received by the user from the visual recognition targets OJ1 and OJ2, the display forms of the associated images IM7, IM8, IM9, and IM10 associated with the detection targets TWa and TWb. Therefore, in the HMD 100b in the third embodiment, the associated image that takes into account the movement characteristics of the user as well is displayed in the image display maximum region PN. Therefore, it is possible to adjust a realistic feeling felt by the user using the associated images. When an image easily visually recognized by the user and an associated image less easily visually recognized by the user are displayed in the image display maximum region PN, by reducing information concerning the associated image less easily visually recognized, it is possible to reduce a load of the processing executed by the HMD 100b.

In the HMD 100b in the third embodiment, as compared in the example shown in FIG. 14 and the example shown in FIG. 15, even when the detection targets TWa and TWb are located in the same region of the outside scene with respect to the visual line direction ED, the image setting section 165b changes the display forms of the associated images according to the movement characteristics of the visual recognition targets. Therefore, in the HMD 100b in the third embodiment, it is possible to further adjust, using the associated images, a realistic feeling felt by the user.

D. Fourth Embodiment

In an HMD 100c in a fourth embodiment, moving speed of an image picked-up target is specified. An image setting section 165c sets a display form of an associated image on the basis of the specified moving seed of the target with respect to a user wearing an image display section 20c and the visual line direction ED of the user. In the HMD 100c, a radio communication section 132c performs radio communication to acquire data of a detection target and image data, on which an associated image associated with the detection target is based, from another server. The image data acquired by the radio communication section 132c is classified into a plurality of categories. The radio communication section 132 acquires these categories in association with the image data as well. Examples of the categories include "guidance" for teaching the user, for example, a road to a destination and "warning" for calling attention of the user because of an unexpected event such as a natural disaster. Note that the radio communication section 132c is equivalent to the image-data acquiring section in the appended claims.

Figure 16:
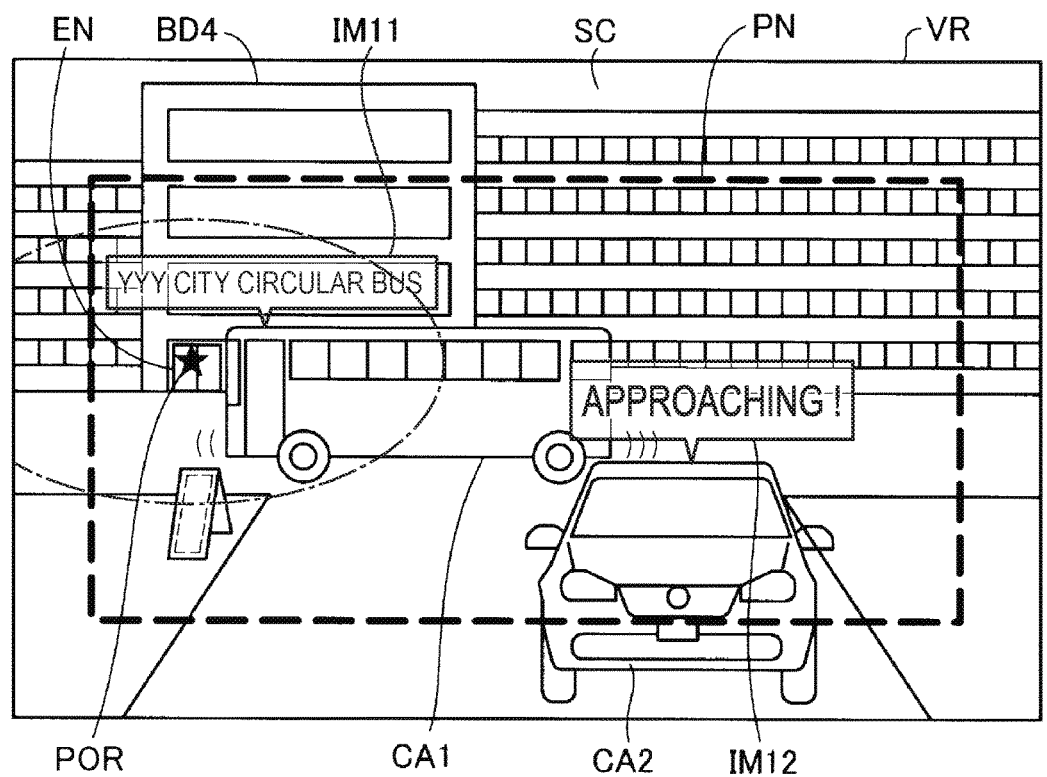
FIG. 16 is an explanatory diagram of a visual field visually recognized by a user, who is a pedestrian, in a fourth embodiment.

FIG. 16 is an explanatory diagram of the visual field VR visually recognized by the user, who is a pedestrian, in the fourth embodiment. As shown in FIG. 16, the user visually recognizes the outside scene SC including a building BD4 and the like and an associated image IM11 and an associated image IM12 displayed in the image display maximum region PN. In an example shown in FIG. 16, the user is visually recognizing an entrance EN of the building BD4 as the gazing point POR. Note that, in FIG. 16, the visual field range VR2 explained in the first embodiment is shown centering on the gazing point POR. The associated image IM11 is an image displayed in association with a moving object CA1 serving as a detection target. The moving object CA1 is a circular bus running on the road in front of the building BD4 to traverse (to the left and right) the visual-line-direction of the user. The associated image IM11 is a character image (yyy city circular bus) indicating that the moving object CA1 is a bus circulating in yyy city.

The associated image IM12 is an image displayed in association with a moving object CA2 serving as a detection target. The moving object CA2 is an automobile traveling toward the direction of the user. The image setting section 165c determines a display form of the associated image IM12 on the basis of image data acquired via the radio communication section 132c and causes the image display section 20c to display the associated image IMI12 in the image display maximum region PN. In the fourth embodiment, a direction specifying section 166c measures, on the basis of the image display section 20c, moving speed of a target included in picked-up images picked up by the cameras 61 and 62. A category associated with image data, on which the associated image IM12 is based, is "warning". In this case, when determining that the moving object CA2 approaches the user (the image display section 20c) at speed equal to or higher than speed set in advance, irrespective of a positional relation between the gazing point POR and the visual field range VR2, the image setting section 165c causes the image display section 20c to display, in the image display maximum region PN, the associated image IM12 larger than the other associated images such as the associated image IM11. Therefore, as shown in FIG. 16, a font of the associated image IM12 of a character image "approaching!" for calling attention to the approach of the moving object CA2 to the user is displayed in the image display maximum region PN larger than a font of the associated image IM11. Note that the direction specifying section 166c is equivalent to the moving-object specifying section in the appended claims.

As explained above, in the HMD 100c in the fourth embodiment, the image setting section 165c sets, on the basis of, in addition to the visual line direction ED, the speed of the moving object CA2 serving as the detection target approaching the user wearing the image display section 20c, a display form of the associated image IM12 associated with the moving object CA2. Therefore, in the HMD 100c in the fourth embodiment, when there is a moving object approaching the user at high speed, it is possible to inform the user of a danger. Convenience of the user is improved.

E. Modifications

Note that the invention is not limited to the embodiments and can be carried out in various modes without departing from the spirit of the invention. For example, modifications explained below are also possible.

E-1. Modification 1

Figure 17:
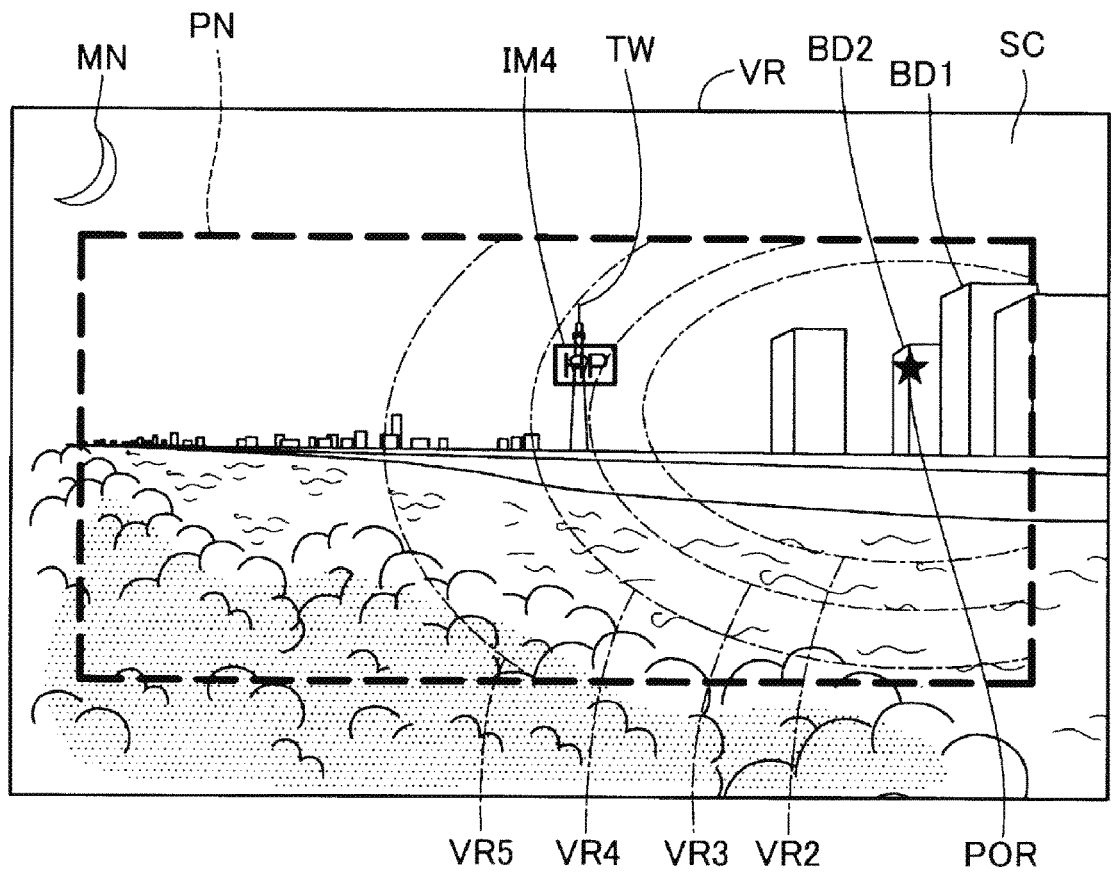
FIG. 17 is an explanatory diagram showing an example of a visual field visually recognized by the user in a modification.

FIG. 17 is an explanatory diagram showing an example of the visual field VR visually recognized by the user in a modification. In FIG. 17, compared with FIG. 12 in the first embodiment, the visual field VR after the gazing point POR of the user changes from the building BD1 to a building BD2 is shown. In the example shown in FIG. 17, the gazing point POR of the user is the building BD2. Therefore, the image setting section 165 determines that the position of the detection target TW in the picked-up images of the cameras 61 and 62 belongs to the visual field range VR3 and causes the image display section 20 to display an associated image IM4 serving as the display image in the image display maximum region PN. The associated image IM4 is an image displayed as (B) a three-dimensional image further including distance information in addition to the image data of the associated image IM3 shown in FIG. 12. In other words, the associated image IM4 is an image including contents of (B) the three-dimensional image including the distance information and (C) color information of RGB. Note that the visual field range VR4 is equivalent to the fourth visual field range in the appended claims. A visual field range further on the inner side than the visual field range VR4 is equivalent to the third visual field range in the appended claims.

In this way, in the HMD 100 in this modification, in the visual field range VR3, the image setting section 165 causes the image display section 20 to display, on the basis of the image data of the associated image IM1, in the image display maximum region PN, the associated image IM4 serving as the three-dimensional image including the distance information. Therefore, in the HMD 100 in this modification, on the basis of the same image data, a three-dimensional image is displayed in a range in which the user can recognize the image data as the three-dimensional image and a two-dimensional image is displayed in a range in which it is hard for the user to recognize the three-dimensional image. Consequently, it is possible to further increase the speed of the processing for displaying the associated image without reducing the easiness of the recognition of the user who visually recognizes the associated image.

Figure 18:
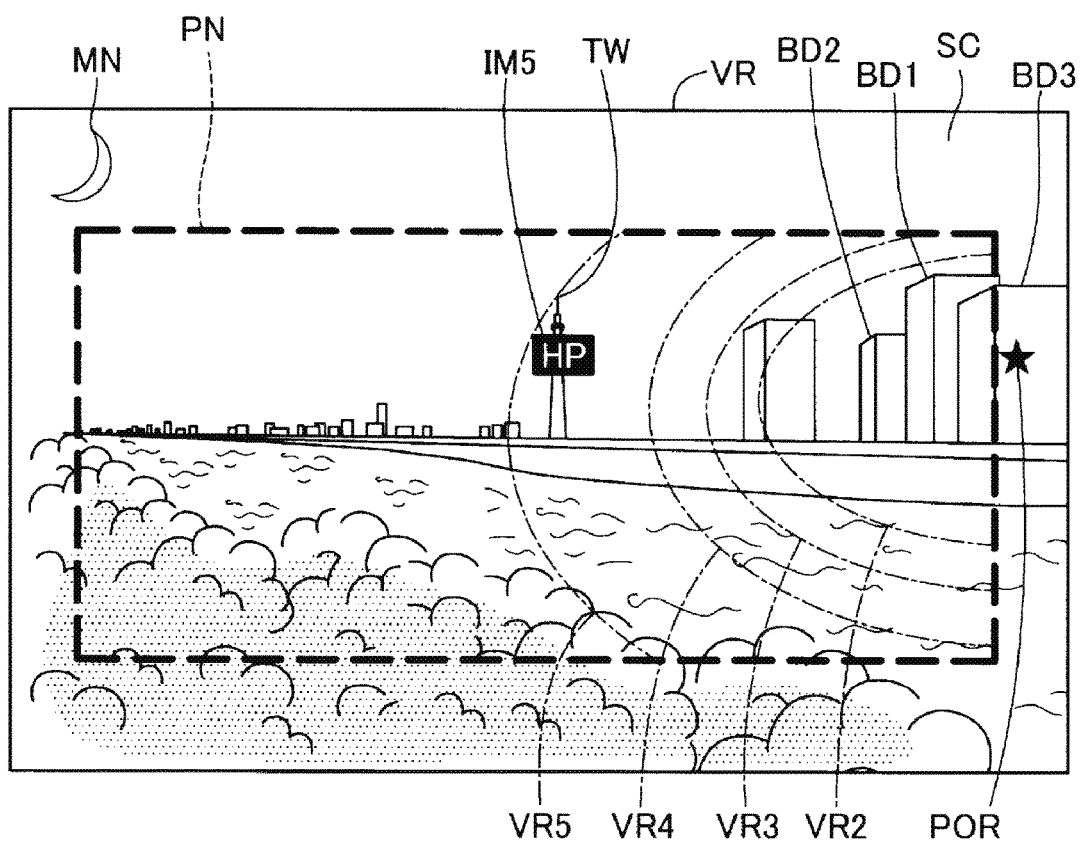
FIG. 18 is an explanatory diagram showing an example of a visual field visually recognized by the user in the modification.

FIG. 18 is an explanatory diagram showing an example of the visual field VR visually recognized by the user in the modification. In FIG. 18, compared with FIG. 12 in the first embodiment, the visual field VR after the gazing point POR of the user changes from the building BD1 to a building BD3 is shown. In the example shown in FIG. 18, the gazing point POR of the user US is the building BD3. Therefore, the image setting section 165 determines that the position of the detection target TW in the picked-up images of the cameras 61 and 62 belongs to the visual field range VR5 and causes the image display section 20 to display an associated image IM5 serving as a display image in the image display maximum region PN. The associated image IM5 is an image represented by light and shade of white and black and created on the basis of image data same as the image data of the associated image IM1. The associated image IM5 is an image not including color information of RGB and, in order to improve visibility of the user, representing characters "HP" in a light color with a rectangular image having a dark color set as a background. In other words, the associated image IM5 is an image not including (C) color information of RGB in the associated image IM3. Note that the visual field range VR5 is equivalent to the sixth visual field range in the appended claims. A visual field range further on the inner side than the visual field range VR5 is equivalent to the fifth visual field range in the appended claims.

In this way, in the HMD 100 in this modification, in the visual field range VR5, the image setting section 165 causes the image display section 20 to display, on the basis of the image data of the associated image IM1, in the image display maximum region PN, the associated image IM5 not including the color information of RGB. Therefore, in the HMD 100 in this modification, on the basis of the same image data, an associated image including the color information of RGB is displayed in a range in which the user can recognize various kinds of color information including RGB and an associated image including only color information of white and black is displayed in a range in which it is hard for the user to recognize color information. Consequently, it is possible to further increase the speed of the processing for displaying the associated image without reducing the easiness of the recognition of the user who visually recognizes the associated image.

E-2. Modification 2

Figure 19:
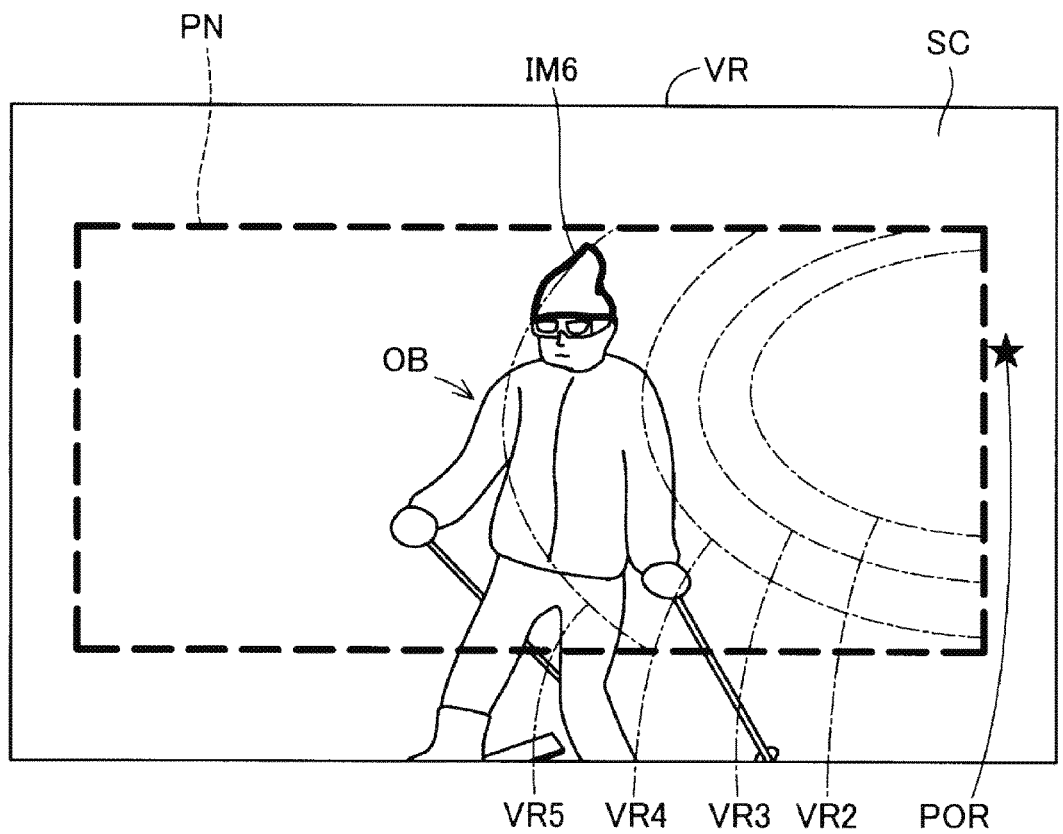
FIG. 19 is an explanatory diagram showing an example of a visual field visually recognized by the user when an associated image belongs to a visual field range.

FIG. 19 is an explanatory diagram showing an example of the visual field VR visually recognized by the user when the associated image IM5 belongs to the visual field range VR5. In FIG. 19, the visual field VR is shown in which an associated image IM6, which is an image of a cap, is superimposed and displayed in the position of the head of an image picked-up human object OB. The object OB is a human wearing skiwear in the upper half and the lower half of the body. Actually, the object OB does not wear the cap in the head. As shown in FIG. 19, the gazing point POR of the user of the HMD 100 is a position apart from the object OB. In this case, a region where the associated image IM6 is displayed in the image display maximum region PN belongs to the visual field range VR5. Image data, on which the associated image IM6 is based, also includes color information such as a pattern of the cap displayed as an associated image IM6. However, since the display position of the associated image IM6 belongs to the visual field range VR5, the image setting section 165 causes the image display section 20 to display the associated image IM6 in the image display maximum region PN as an image not including a pattern and color information such as RGB and representing only the outer frame of the cap in dark black. In other words, the image setting section 165 causes the image display section 20 to display an image of only the outer frame of the image of the cap in the image display maximum region PN in order to cause the user to recognize the contour of the associated image IM6.

As explained above, in the HMD 100 in this modification, in the visual field range VR5, the image setting section 165 causes the image display section 20 to display, on the basis of the image data, the associated image IM6 of only the contour of the display image in the image display maximum region PN. Therefore, in the HMD 100 in this modification, only the outer frame of the image is displayed in a region where it is hard for the user to recognize color information. Therefore, it is possible to further increase the speed of the processing for displaying the associated image without reducing the easiness of the recognition of the user who visually recognizes the associated image.

E-3. Modification 3

In the embodiments, the display image is displayed in a part of the image display maximum region PN. However, the display image may be an image displayed in the entire image display maximum region PN or may be an image different from the associated image associated with the detection target detected from the picked-up images of the cameras 61 and 62. For example, the display image may be a moving image such as a movie reproduced according to contents or the like irrespective of the detection target. The moving image serving as the display image may be displayed in the entire image display maximum region PN. When the image is the moving image displayed in the entire image display maximum region PN, if determining that the visual line direction ED of the user is absent on the image display maximum region PN, the image setting section 165 may not display the moving image. In this way, the image setting section 165 variously modifies and sets the display form of the display image on the basis of the image displayed in the image display maximum region PN and the specified visual line direction ED of the user.

In the embodiments, the visual line direction ED of the user is specified on the basis of the picked-up images of the eye-image pickup cameras 37 and 38. However, the visual line direction ED of the user may be specified by other methods. For example, the visual line direction ED of the user may be specified according to the direction of the image display section 20. Specifically, the visual line direction ED of the user wearing the image display section 20 on the head may be specified as the front direction of the image display section 20. The center of the image display maximum region PN may be always set as the gazing point POR of the user. With the HMD 100 in this modification, it is possible to simply and inexpensively specify the visual line direction ED of the user without using devices such as the eye-image pickup cameras 37 and 38. A gyro sensor may be mounted on the image display section 20. The direction of the image display section 20 may be specified on the basis of angular velocity detected by the gyro sensor. The visual line direction of the user may be specified according to muscle potential detected by electrodes disposed in portions in contact with the temples and the nose of the user.

In the embodiments, the range with respect to the gazing point POR of the user such as the visual field range VR2 is set according to the visual field of the human and the degree of the visual recognition of the human related to the visual field. However, these ranges can be variously modified. The visual field range VR2 and the like may be set according to, for example, brightness such as the luminance of the outside scene SC, the vision of the user of the HMD 100, and the resolution of a displayed image.

In the embodiments, the distance to the target object included in the picked-up image is measured on the basis of the picked-up images of the cameras 61 and 62. However, a method of measuring the distance to the target object and presence or absence of the measurement can be variously modified. The distance to the target object does not always need to be measured.

In the embodiments, the user wearing the image display section 20 can visually recognize the transmitted outside scene SC. However, the HMD 100 may be an HMD of a so-called closed type with which the user cannot visually recognize the outside scene SC.

In the embodiments, the stereo camera configured by the first camera 61 and the second camera 62 is used as the image pickup section that picks up an image of the outside scene SC. However, one camera may be used or three or more cameras may be used. Positions where the cameras are disposed do not always need to be included in the image display section 20. The cameras may be configured separately from the image display section 20.

There is an individual difference in the visual characteristic of the user. Therefore, the correspondence relation between the visual field range and the image displayed on the image display section 20 may be changed according to reception of predetermined operation by the operation section 135.

In the embodiments, the method of forming the binocular parallax is used in order to cause the user to recognize the display image as the three-dimensional image. However, the method of causing the user to recognize the display image as the three-dimensional image can be variously modified. For example, as the method of causing the user to recognize the display image as the three-dimensional image, an image to be convergently moved may be displayed on the image display section 20 or a shade may be given to an image or the size of the image may be changed to represent a depth feeling. The two-dimensional image may also be, for example, an image displayed on the image display section 20 as an infinite distance not including distance information. The method can be variously modified.

As shown in FIG. 18, in the visual field range VR5, the associated image IM5 not including the color information of RGB is displayed in the image display maximum region PN. However, an example of the associated image not including the color information is not limited to this and can be variously modified. For example, an image obtained by giving light and shade to a single color such as red may be displayed in the image display maximum region PN. An image with reduced color information may be an image only displayed by a gray scale of a specific color.

In the embodiments, as shown in FIG. 11, the associated image IM2, which is the image of the circle, is displayed in the image display maximum region PN as the simplified image. However, the simplified image can be variously modified. For example, the simplified image may be an image of a triangle or a square other than the circle or may be a shape of some symbol mark that is associated with image data and easily reminds the user of the image data. Compared with the image (e.g., the associated image IM1) displayed on the basis of the image data, the simplified image only has to be an image that is not complicated and is enough for causing the user to recognize that the simplified image is present.

In the embodiments, the form of the image displayed in the image display maximum region PN is changed on the basis of the relation between the visual line direction of the user and the visual field range of the user. However, the position where the image is displayed may be changed rather than the form of the image. For example, when the visual line direction is included in the visual field range VR2, the image may be displayed in the entire image display maximum region PN. When the visual line direction is in the range further on the outer side than the visual field range VR5, the simplified image may be displayed in a part of the image display maximum region PN.

E-4. Modification 4

In the fourth embodiment, the moving object CA2 is set in advance as the detection target. However, when it is determined that a target not set in advance as the detection target approaches the user at speed equal to or higher than the speed explained above, the target may be set as the detection target anew. When the associated image IM12 shown in FIG. 16 is included in the visual field range VR2 near the gazing point POR, the associated image IM12 may be displayed in the image display maximum region PN in a font same as the font of the associated image IM11. This is because, when the associated image IM12 for calling attention of the user is displayed near the gazing point POR in the image display maximum region PN, it is determined that the user is gazing at the associated image IM12. As another embodiment, rather than the radio communication section 132c acquiring the image data, on which the associated image is based, from another server, the HMD 100c may include a storing section having stored therein these image data as a database. The image setting section 165c of the HMD 100c may acquire image data and the like from a database connected via the interface 180.

As explained above, in the HMD 100c in the modification, even if a target is not stored in advance as the detection target TW, when the target approaches the user wearing the image display section 20c at speed equal to or higher than fixed speed, the image setting section 165c determines that the target as the detection target TW and causes the image display section 20c to display the associated image IM12 such as warning set in advance in the image display maximum region PN. Therefore, in the HMD 100c in the fourth embodiment, it is possible to more appropriately inform the user of a danger. Convenience of the user is improved.

E-5. Modification 5

In a modification 5, an image setting section 165d in this modification is different from the image setting section 165c of the HMD 100c in the fourth embodiment in that the image setting section 165d changes a display position of an associated image according to a category associated with image data. The image setting section 165d performs weighting of priority of display according to a category and causes an image display section 20d to display, near the gazing point POR, a display image based on image data associated with a category having high priority. Note that the category associated with the image data is equivalent to the type of the image data in the appended claims.

Figure 20:
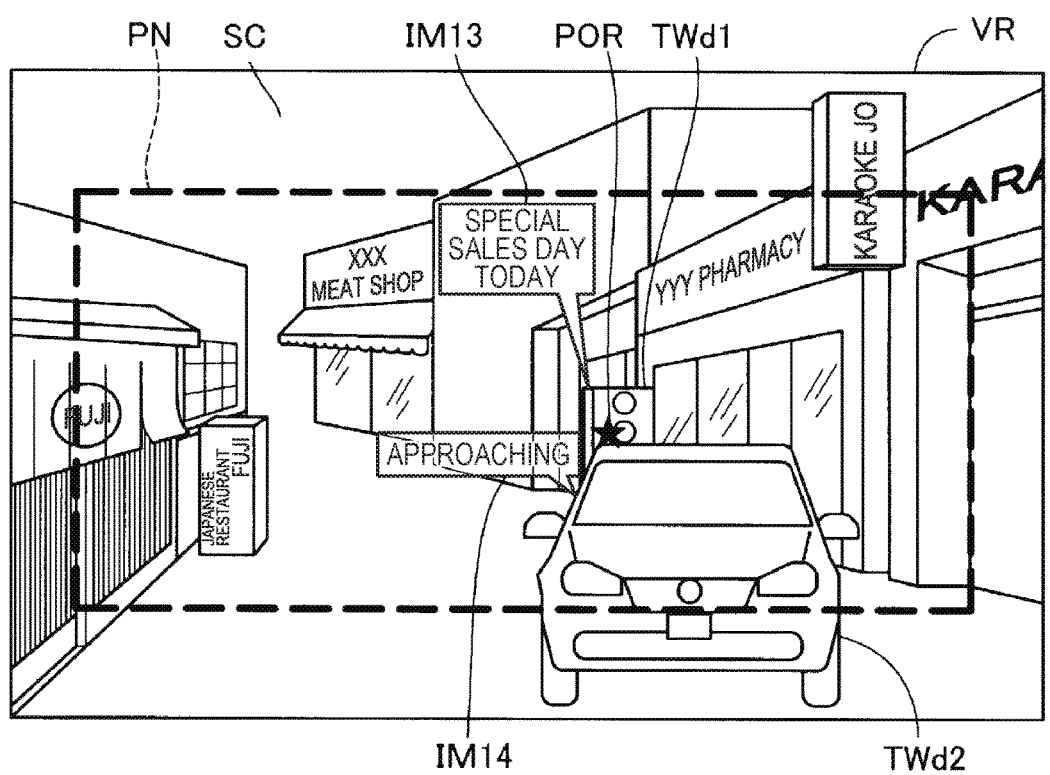
FIG. 20 is an explanatory diagram of a display position of an associated image in a visual field of the user in a modification.

FIG. 20 is an explanatory diagram of display positions of associated image IM13 and IM14 in the visual field VR of the user in the modification. As shown in FIG. 20, the user wearing the image display section 20d on the head is visually recognizing a shopping street serving as the outside scene SC, the associated image IM14, and an associated image IM15. The gazing point POR of the user is directed to a signboard "yyy pharmacy" in the shopping street. In an example shown in FIG. 20, the cameras 61 and 62 are picking up images of the signboard "yyy pharmacy" serving as a detection target TWd1 and an automobile serving as a detection target TWd2. The associated image IM13 is an image displayed in the image display maximum region PN in association with the detection target TWd1. The associated image IM13 is displayed in a center upper part of the image display maximum region PN. A category associated with image data of the associated image IM13 is "advertisement". The associated image IM14 is an image displayed in the image display maximum region PN in association with the detection target TWd1. The associated image IM14 is displayed in the center of the image display maximum region PN. A category associated with image data of the associated image IM14 is "warning".

When a plurality of detection targets overlap in positions at different distances in the visual line direction ED of the user, the image setting section 165d in the modification sets display forms including display positions of a plurality of associated images on the basis of categories associated with image data of the plurality of associated images such that display regions of the plurality of associated images do not overlap. In FIG. 20, the signboard of the detection target TWd1 and the automobile of the detection target TWd2 overlap near the same gazing point POR. In such a case, the image setting section 165d causes the image display section 20d to display the associated image IM14, the category of which is "warning", in the center of the image display maximum region PN such that the associated image IM14 is more conspicuous than the associated image IM13, the category of which is "advertisement". The image setting section 165d displays the associated image IM14 larger than the associated image IM13.

As explained above, in an HMD 100d in the modification, the image setting section 165d sets, according to the category associated with the image data of the associated image, the display form in the image display maximum region PN of the associated image associated with the detection target. Therefore, in the HMD 100d in the modification, an image that the HMD 100d more desires to cause the user to visually recognize is preferentially displayed in the image display maximum region PN to improve convenience of the user.

E-6. Modification 6

In the embodiments, the operation section 135 is formed in the control section 10. However, a form of the operation section 135 can be variously changed. For example, a user interface, which is the operation section 135, may be provided separately from the control section 10. In this case, since the operation section 135 is separate from the control section 10 in which the power supply 130 and the like are formed, the operation section 135 can be reduced in size. Operability of the user is improved. In the embodiments, the cameras 61 and 62 are disposed in the image display section 20. However, the camera 61 may be configured separately from the image display section 20 and capable of picking up an image of the outside scene SC. In the HMD 100, all of the CPU 140, the power supply 130, and the like configuring the control section 10 may be mounted on the image display section 20. In the HMD 100, a controller configured separately from the image display section 20 is absent. Therefore, the HMD 100 can be further reduced in size. The CPUs 140 may be respectively mounted on the control section 10 and the image display section 20. Therefore, the control section 10 may be used as a single controller and the image display section 20 may be used as a single display device.

For example, the image-light generating section may include an organic EL (Electro-Luminescence) display and an organic EL control section. For example, as the image-light generating section, an LCOS (Liquid crystal on silicon; LCoS is a registered trademark), a digital micro-mirror device, and the like can be used instead of the LCD. For example, the invention can also be applied to the HMD 100 of a laser retinal projection type. The image display maximum region PN may be configured by a display of a MEMS shutter system that opens and closes MEMS shutters formed in pixels.

In the HMD 100, a scanning optical system including a MEMS mirror may be adopted as the image-light generating section and a MEMS display technique may be used. As a specific configuration, the HMD 100 may include, as a light emitting section, a signal-light forming section, a scanning optical system including a MEMS mirror that scans light emitted by the signal-light forming section, and an optical member on which a virtual image is formed by the light scanned by the scanning optical system. When the HMD 100 includes this configuration, the light emitted by the image-light forming section is reflected by the MEMS mirror, made incident on the optical member, and guided by the optical member to reach a virtual-image forming surface (e.g., a reflection surface). The MEMS mirror scans the light, whereby a virtual image is formed on the virtual-image forming surface. The user visually recognizes the formed virtual image to recognize an image.

For example, the HMD 100 may be a head mounted display of a form in which the optical-image display sections cover only a part of the eyes of the user, in other words, a form in which the optical-image display sections do not completely cover the eyes of the user. The HMD 100 may be a head mounted display of a so-called monocular type. Instead of the HMD 100, a hand-held display fixed in a position by the user with the hands like a binocular rather than being mounted on the head of the user may be used as the image display device. In the embodiments, the HMD 100 is a binocular optical transmission type. However, the invention can also be applied to head-mounted display devices of other types such as a video transmission type.

The HMD 100 may be used as a display device for only displaying an image based on an image signal received from another device. Specifically, the HMD 100 may be used as a display device equivalent to a monitor of a desktop PC. For example, the HMD 100 receives an image signal from the desktop PC, whereby an image may be displayed in the image display maximum region PN of the image display section 20.

The HMD 100 may be used to function as a part of a system. For example, the HMD 100 may be used as a device for executing a function of a part of a system including an airplane. A system in which the HMD 100 is used is not limited to the system including the airplane and may be systems including an automobile, a bicycle, and the like.

As the earphones, an ear hook type or a headband type may be adopted. The earphones may be omitted. For example, the HMD 100 may be configured as a head-mounted display device mounted on vehicles such as an automobile and an airplane. For example, the HMD 100 may be configured as a head-mounted display device incorporated in a body protector such as a helmet.

E-7. Modification 7

The configurations of the HMD 100 in the embodiments are only examples and can be variously modified. For example, the direction key 16 provided in the control section 10 may be omitted. Another interface for operation such as a stick for operation may be provided in addition to the direction key 16 and the track pad 14. Input devices such as a keyboard and a mouse may be connectable to the control section 10. The control section 10 may receive inputs from the keyboard and the mouse.

As the image display section, instead of the image display section 20 worn like eyeglasses, an image display section of another type such as an image display section worn like a cap may be adopted. The earphones 32 and 34 can be omitted as appropriate. In the embodiments, the LCD and the light source are used as the components that generate image light. However, instead of the LCD and the light source, another display element such as an organic EL display may be adopted.

Figure 21A:
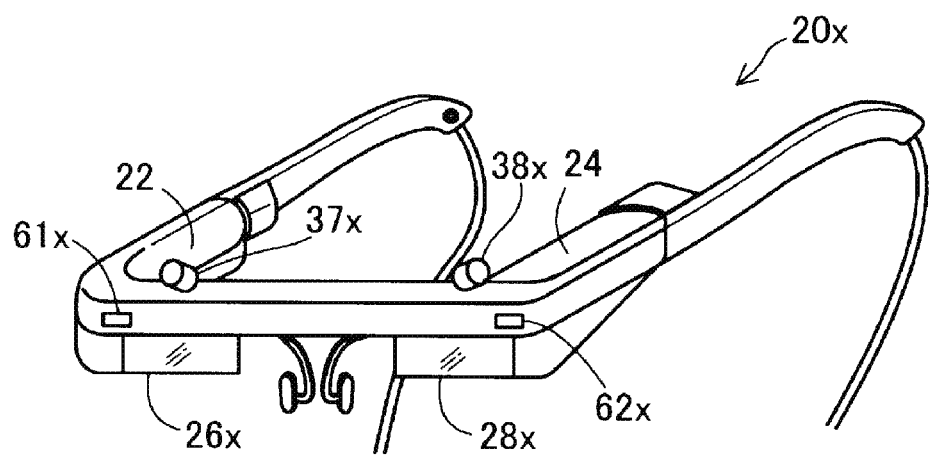
FIGS. 21A and 21B are explanatory diagrams showing the exterior configurations of HMDs in a modification.
Figure 21B:
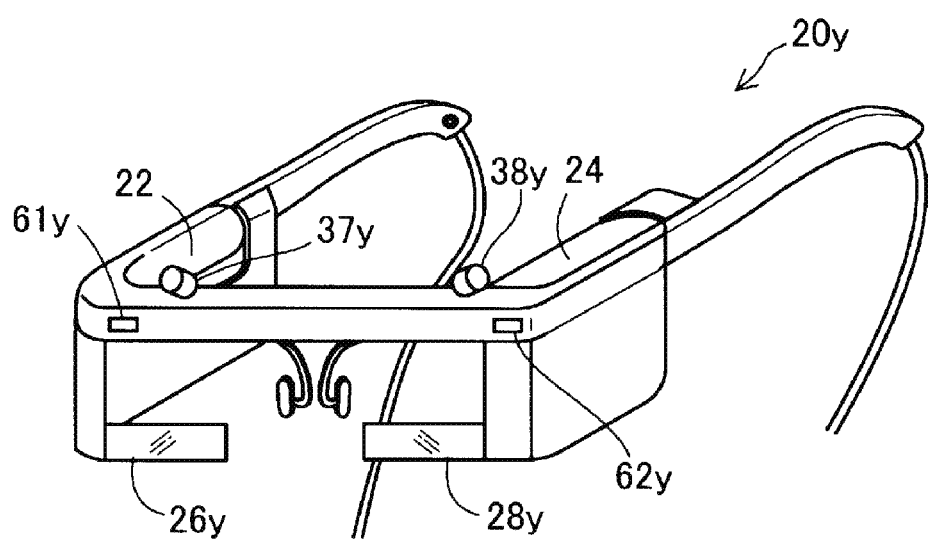

FIGS. 21A and 21B are explanatory diagrams showing the exterior configurations of HMDs in a modification. In the case of an example shown in FIG. 21A, the HMD is different from the HMD 100 shown in FIG. 1 in that an image display section 20x includes a right optical-image display section 26x instead of the right optical-image display section 26 and includes a left optical-image display section 28x instead of the left optical-image display section 28. The right optical-image display section 26x is formed smaller than the optical member in the embodiments and disposed obliquely above the right eye of the user during wearing of an HMD 100x. Similarly, the left optical-image display section 28x is formed smaller than the optical member in the embodiments and disposed obliquely above the left eye of the user during wearing of the HMD 100x. In the case of an example shown in FIG. 21B, the HMD is different from the HMD 100 shown in FIG. 1 in that an image display section 20y includes a right optical-image display section 26y instead of the right optical-image display section 26 and includes a left optical-image display section 28y instead of the left optical-image display section 28. The right optical-image display section 26y is formed smaller than the optical member in the embodiments and disposed obliquely below the right eye of the user during wearing of an HMD 100y. The left optical-image display section 28y is formed smaller than the optical member in the embodiments and disposed obliquely below the left eye of the user during wearing of the HMD 100y. In this way, the optical-image display sections only have to be disposed in the vicinity of the eyes of the user. The size of the optical members forming the optical-image display sections may be any size. The HMD 100 can be realized in which the optical-image display sections cover only a part of the eyes of the user, in other words, the optical-image display sections do not completely cover the eyes of the user.

In the embodiments, the HMD 100 may guide image lights representing the same image to the left and right eyes of the user and cause the user to visually recognize a two-dimensional image or may guide image lights representing different images to the left and right eyes of the user and cause the user to visually recognize a three-dimensional image.

In the embodiments, a part of the components realized by hardware may be replaced with software. Conversely, apart of the components realized by software may be replaced with hardware. For example, in the embodiments, the image processing section 160 and the sound processing section 170 are realized by the CPU 140 reading out and executing the computer program. However, these functional sections may be realized by hardware circuits.

When a part or all of the functions of the invention are realized by software, the software (a computer program) can be provided while being stored in a computer-readable recording medium. In the invention, the "computer-readable recording medium" is not limited to portable recording media such as a flexible disk and a CD-ROM and includes various internal storage devices in a computer such as a RAM and a ROM and external storage devices fixed to the computer such as a hard disk.

In the embodiments, as shown in FIGS. 1 and 2, the control section 10 and the image display section 20 are formed as the separate components. However, the configuration of the control section 10 and the image display section 20 is not limited to this and can be variously modified. For example, on the inside of the image display section 20, all of the components formed in the control section 10 may be formed or a part of the components may be formed. The power supply 130 in the embodiment may be independently formed and configured to be replaceable. The components formed in the control section 10 may be redundantly formed in the image display section 20. For example, the CPU 140 shown in FIG. 2 may be formed in both of the control section 10 and the image display section 20. Functions performed by the CPU 140 formed in the control section 10 and the CPU formed in the image display section 20 may be divided.

The invention is not limited to the embodiments and the modifications explained above and can be realized in various configurations without departing from the spirit of the invention. For example, the technical features in the embodiments and the modifications corresponding to the technical features in the aspects described in the summary of the invention can be replaced or combined as appropriate in order to solve a part or all of the problems or achieve a part or all of the effects. Unless the technical features are explained in this specification as essential technical features, the technical features can be deleted as appropriate.

The entire disclosure of Japanese Patent Application No.: 2015-052816, filed Mar. 17, 2015 and 2015-251491, filed Dec. 24, 2015 are expressly incorporated by reference herein.

What is claimed is:

1. A head-mounted display device comprising:
a display capable of displaying an image in a display region of the display; and
a processor or circuit configured to:
   detect a specific target object;
   specify a visual line direction of a user;
   determine whether the specified visual line direction of the user corresponds to one of at least two visual line direction ranges, a first visual line direction range of the at least two visual line direction ranges being within a first predetermined distance from the detected specific target object, a second visual line direction range of the at least two visual line direction ranges being within a second predetermined distance from the detected specific target object, the second predetermined distance being different from the first predetermined distance;
   when the specified visual line direction of the user corresponds to the first visual line direction range: cause the display to display a first display image within the first visual line direction range that is within the first predetermined distance from the detected specific target object;
   when the specified visual line direction of the user corresponds to the second visual line direction range, but is outside of the first visual line direction range: determine whether the first display image includes at least one of: character/text data, three-dimensional (3D) data, distance data, and color data;
      when the first display image does not include the at least one of: character/text data, three-dimensional (3D) data, distance data, and color data: cause the display to display the first display image; and
      when the first display image includes the at least one of: character/text data, three-dimensional (3D) data, distance data, and color data: cause the display to display a second display image that is different from the first display image; and
   when the specified visual line direction of the user does not correspond to any of the at least two visual line direction ranges, cause the display to display the second display image.

2. The head-mounted display device according to claim 1, wherein the processor or circuit is further configured to: change the first display image to the second display image according to a visual characteristic of the user that changes according to the specified visual line direction of the user.

3. The head-mounted display device according to claim 2, wherein the visual characteristic is a characteristic related to a saccade, and the processor or circuit is further configured to: set, as the visual line direction range of the user, a range that includes a range added with a visual angle by the saccade.

4. The head-mounted display device according to claim 1, wherein the processor or circuit is further configured to: cause the display to change the first display image to the second display image according to a position of the first display image and the specified visual line direction of the user.

5. The head-mounted display device according to claim 1, wherein
the display is capable of transmitting an outside scene,
the head-mounted display device further comprises a camera configured to capture an image of the outside scene, and
the processor or circuit is further configured to:
detect the specific target object from the captured image of the outside scene, and
set a position of the first display image or the second display image in association with a position of the detected specific target object.

6. The head-mounted display device according to claim 5, wherein the processor or circuit is further configured to:
detect a direction of the display, and
specify the visual line direction of the user on the basis of the detected direction of the display.

7. The head-mounted display device according to claim 5, wherein the processor or circuit is further configured to:
detect eyes of the user in a captured image that includes the eyes of the user, and
specify the visual line direction of the user on the basis of the captured image that includes the eyes of the user.

8. The head-mounted display device according to claim 5, wherein the processor or circuit is further configured to:
specify a distance to a visual recognition target visually recognized by the user, and
set, on the basis of the visual recognition target and a movement characteristic of the visual recognition target based on a moving background that is a range other than the visual recognition target and that is moving with respect to the visual recognition target, a display form of the first or second display image associated with the detected specific target object.

9. The head-mounted display device according to claim 8, wherein the display form of the first or second display image is a simpler display form compared to a display form of the first or second display image when the background is not moving with respect to the visual recognition target.

10. The head-mounted display device according to claim 5, wherein
the display is capable of transmitting an outside scene image, and
the processor or circuit is further configured to:
identify and acquire image data, which is a source of the display image associated with the detected specific target object, for each of types of the image data, and
when the camera captures an image of the specific target object, determine, on the basis of a type of the acquired image data and a position of the detected specific target object with respect to the display region, a form of the first or second display image associated with the detected specific target object.

11. The head-mounted display device according to claim 5, wherein the processor or circuit is further configured to:
specify a moving object moving in the outside scene, and
set, on the basis of a speed of the moving object approaching the display, a display form of the first display image or the second display image associated with the detected specific target object.

12. The head-mounted display device according to claim 11, wherein the processor or circuit is further configured to, when the specified moving object is outside of a predetermined region centering on the visual line direction of the user and is approaching the display at a speed equal to or higher than a predetermined speed set in advance:
determine that the moving object is the specific target object even if the moving object is not set as the specific target object in advance, and
set, in the determined specific target object, a predetermined display image set in advance.

13. The head-mounted display device according to claim 1, wherein the first display image includes a character or text, and the second display image does not include any characters or text.

14. The head-mounted display device according to claim 1, wherein the first display image is a three-dimensional display image, and the second display image is a two-dimensional display image.

15. The head-mounted display device according to claim 1, wherein the first display image is an image including a plurality of colors, and the second display image includes light and shade of a single color.

16. The head-mounted display device according to claim 15, wherein the processor or circuit is further configured to: cause the display to display, as the second display image, only a contour of the first display image.

17. The head-mounted display device according to claim 1, wherein the processor or circuit is further configured to cause the display to display, as an associated image of the detected specific target object included in the visual line direction range of the user, an image that only represents the position of the detected specific target object.

18. A control method for a head-mounted display device that includes a display capable of displaying an image in a display region of the display, the method comprising:
detecting a target object;
specifying a visual line direction of a user;
determining whether the specified visual line direction of the user corresponds to one of at least two visual line direction ranges, a first visual line direction range of the at least two visual line direction ranges being within a first predetermined distance from the detected specific target object, a second visual line direction range of the at least two visual line direction ranges being within a second predetermined distance from the detected specific target object, the second predetermined distance being different from the first predetermined distance;
when the specified visual line direction of the user corresponds to the first visual line direction range: causing the display to display a first display image within the first visual line direction range that is within the first predetermined distance from the detected specific target object;
when the specified visual line direction of the user corresponds to the second visual line direction range, but is outside of the first visual line direction range:

determining whether the first display image includes at least one of: character/text data, three-dimensional (3D) data, distance data, and color data;

when the first display image does not include the at least one of: character/text data, three-dimensional (3D) data, distance data, and color data: causing the display to display the first display image; and when the first display image includes the at least one of: character/text data, three-dimensional (3D) data, distance data, and color data: causing the display to display a second display image that is different from the first display image; and when the specified visual line direction of the user does not correspond to any of the at least two visual line direction ranges, causing the display to display the second display image.

19. A non-transitory computer readable medium comprising computer program instructions that, when executed by a processor of a head-mounted display device, cause the processor to:

detect a target object;

specify a visual line direction of a user;

determine whether the specified visual line direction of the user corresponds to one of at least two visual line direction ranges, a first visual line direction range of the at least two visual line direction ranges being within a first predetermined distance from the detected specific target object, a second visual line direction range of the at least two visual line direction ranges being within a second predetermined distance from the detected specific target object, the second predetermined distance being different from the first predetermined distance;

when the specified visual line direction of the user corresponds to the first visual line direction range: cause the display to display a first display image within the first visual line direction range that is within the first predetermined distance from the detected specific target object;

when the specified visual line direction of the user corresponds to the second visual line direction range, but is outside of the first visual line direction range:

determine whether the first display image includes at least one of: character/text data, three-dimensional (3D) data, distance data, and color data;

when the first display image does not include the at least one of: character/text data, three-dimensional (3D) data, distance data, and color data: cause the display to display the first display image; and when the first display image includes the at least one of: character/text data, three-dimensional (3D) data, distance data, and color data: cause the display to display a second display image that is different from the first display image; and when the specified visual line direction of the user does not correspond to any of the at least two visual line direction ranges, cause the display to display the second display image.

20. The head-mounted display according to claim 1, wherein the quality of the second display image is of a reduced quality compared to the quality of the first display image.

21. The head-mounted display according to claim 1, wherein the resolution of the second display image is reduced compared to the resolution of the first display image.

22. The head-mounted display according to claim 1, wherein the at least one of character/text data, three-dimensional (3D) data, distance data, and color data, is character/text data.

23. The head-mounted display according to claim 1, wherein the second predetermined distance is longer than the first predetermined distance.

24. The head-mounted display according to claim 1, wherein the second display image does not include the at least one of: character/text data, three-dimensional (3D) data, distance data, and color data.

25. The head-mounted display according to claim 1, wherein the second display image does not include any of: character/text data, three-dimensional (3D) data, distance data, and color data.

26. The head-mounted display according to claim 1, wherein the second display image does not include character/text data.

27. The head-mounted display according to claim 1, wherein the second visual field range is a visual field range in which it is difficult for the user of the head-mounted display to recognize the at least one of: character/text data, three-dimensional (3D) data, distance data, and color data.

28. The head-mounted display according to claim 26, wherein the second visual field range is a visual field range in which it is difficult for the user of the HMD to recognize characters.

* * * * *